(12) United States Patent
Hamad

(10) Patent No.: US 11,105,367 B2
(45) Date of Patent: Aug. 31, 2021

(54) PASSIVE MAGNETIC BEARING AND ROTATING MACHINERIES INTEGRATING SAID BEARING, INCLUDING ENERGY PRODUCTION TURBINES

(71) Applicant: Telesystem Energy Ltd., Montreal (CA)

(72) Inventor: Imad Hamad, Montreal (CA)

(73) Assignee: Telesystem Energy Ltd., Montreal (CA)

( * ) Notice: Subject to any disclaimer, the term of this patent is extended or adjusted under 35 U.S.C. 154(b) by 47 days.

(21) Appl. No.: 16/745,916

(22) Filed: Jan. 17, 2020

(65) Prior Publication Data

US 2020/0232505 A1 Jul. 23, 2020

Related U.S. Application Data

(60) Provisional application No. 62/794,164, filed on Jan. 18, 2019.

(51) Int. Cl.
*F16C 32/04* (2006.01)

(52) U.S. Cl.
CPC ...... *F16C 32/0427* (2013.01); *F16C 2326/43* (2013.01); *F16C 2360/23* (2013.01); *F16C 2360/31* (2013.01)

(58) Field of Classification Search
CPC ........ F16C 32/00; F16C 32/04; F16C 32/041; F16C 32/042; F16C 32/044; F16C 32/047;

(Continued)

(56) References Cited

U.S. PATENT DOCUMENTS 3,353,028 A 11/1967 Braikevitch et al.
3,904,323 A 9/1975 Martin et al.
(Continued)

FOREIGN PATENT DOCUMENTS

CN 104006078 8/2014
DE 10036307 2/2002
(Continued)

OTHER PUBLICATIONS

Written Opinion of the International Searching Authority, PCT/CA2020/050049 filed on Jan. 17, 2020 (dated Apr. 8, 2020).

(Continued)

*Primary Examiner* — Tran N Nguyen
(74) *Attorney, Agent, or Firm* — Myers Bigel, P.A.

(57) ABSTRACT

An improved passive magnetic bearing (PMB) for rotating machineries and rotating machineries integrating the bearing are configured to counteract the three states dimensional forces applied on them when put in an operating environment having external forces. The improved PMB includes a first ring element having a Halbach array. A second ring element has first and second Halbach arrays extending angularly over respective regions of the second ring. Magnetic interaction from the Halbach array of the first ring with the first and second Halbach arrays of the second ring when the rings are positioned relative each other within an axial operating range defines a combined force curve. This curve can have an axial component matching a predetermined target axial force curve and a radial component matching a predetermined target radial force. In one application, one or more passive magnetic bearings can be integrated in energy producing turbines, whereby the axial component of the force counteracts flow force in a torque generating direction and the radial component counteracts gravitational forces.

30 Claims, 14 Drawing Sheets

(58) Field of Classification Search
CPC .............. F16C 32/0408; F16C 32/0412; F16C 32/0414; F16C 32/0417; F16C 32/0425; F16C 32/0427; F16C 32/0448; F16C 39/00; F16C 39/06; F16C 39/063; H02K 7/00; H02K 7/09
See application file for complete search history.

(56) References Cited

U.S. PATENT DOCUMENTS

| | | | |
|---|---|---|---|
| 4,191,505 | A | 3/1980 | Kaufman |
| 4,204,799 | A | 5/1980 | de Geus |
| 4,320,304 | A | 3/1982 | Karlsson et al. |
| 4,367,413 | A | 1/1983 | Nair |
| 4,367,890 | A | 1/1983 | Spirk |
| 4,508,973 | A | 4/1985 | Payne |
| 5,440,176 | A | 8/1995 | Haining |
| 6,111,332 | A | 8/2000 | Post |
| 6,472,768 | B1 | 10/2002 | Salls |
| 6,475,045 | B2 | 11/2002 | Schultz et al. |
| 6,657,344 | B2 | 12/2003 | Post |
| 6,887,031 | B1 | 5/2005 | Tocher |
| 6,954,006 | B2 | 10/2005 | Williams, Jr. |
| 7,190,087 | B2 | 3/2007 | Williams |
| 7,331,762 | B2 | 2/2008 | Fraenkel |
| 7,425,772 | B2 | 9/2008 | Novo Vidal |
| 7,453,166 | B2 | 11/2008 | Power, III et al. |
| 7,484,363 | B2 | 2/2009 | Reidy et al. |
| 7,605,486 | B2 | 10/2009 | Bridwell |
| 7,713,020 | B2 | 5/2010 | Davidson et al. |
| 7,891,953 | B2 | 2/2011 | Gray et al. |
| 7,902,706 | B2 | 3/2011 | Thibodeau et al. |
| 8,123,457 | B2 | 2/2012 | Krouse |
| 8,222,762 | B2 | 7/2012 | Borgen |
| 8,294,290 | B2 | 10/2012 | da Silva |
| 8,303,241 | B2 | 11/2012 | Corren et al. |
| 8,421,254 | B2 | 4/2013 | Desmeules |
| 8,466,595 | B2 | 6/2013 | Spooner |
| 8,482,141 | B2 | 7/2013 | Aussem et al. |
| 8,558,424 | B2 | 10/2013 | Auten |
| 8,587,144 | B2 | 11/2013 | Urch |
| 8,633,609 | B2 | 1/2014 | Cornelius et al. |
| 8,662,792 | B2 | 3/2014 | Achard et al. |
| 8,864,439 | B2 | 10/2014 | Williams |
| 8,933,598 | B2 | 1/2015 | Dunne et al. |
| 9,097,233 | B1 | 8/2015 | Ramsey |
| 9,284,709 | B2 | 3/2016 | Ives et al. |
| 9,359,991 | B2 | 6/2016 | Davey et al. |
| 9,458,819 | B2 | 10/2016 | Wanni |
| 9,627,941 | B1 | 4/2017 | Wojdylo |
| 9,745,951 | B1 | 8/2017 | Doyle |
| 9,765,647 | B2 | 9/2017 | Ives et al. |
| 9,850,877 | B2 | 12/2017 | McBride |
| 10,066,605 | B2 | 9/2018 | Perriere |
| 2003/0042812 | A1* | 3/2003 | Post .................... F16C 32/0412 310/90.5 |
| 2003/0170132 | A1* | 9/2003 | Englander ............ F16C 39/063 417/423.4 |
| 2007/0241566 | A1 | 10/2007 | Kuehnle |
| 2010/0066089 | A1 | 3/2010 | Best et al. |
| 2010/0111689 | A1 | 5/2010 | Davis |
| 2010/0133838 | A1 | 6/2010 | Borgen |
| 2010/0148513 | A1 | 6/2010 | Susman et al. |
| 2011/0018277 | A1 | 1/2011 | Brace |
| 2011/0110770 | A1 | 5/2011 | Spooner et al. |
| 2011/0148118 | A1 | 6/2011 | Burnett et al. |
| 2011/0237863 | A1* | 9/2011 | Ricci ..................... A61M 60/82 600/16 |
| 2011/0291419 | A1 | 12/2011 | Dunne et al. |
| 2011/0298216 | A1 | 12/2011 | Ives et al. |
| 2012/0211990 | A1* | 8/2012 | Davey ................. F16C 32/0417 290/54 |
| 2012/0282037 | A1 | 11/2012 | Luppi |
| 2013/0243527 | A1 | 9/2013 | Ayre |
| 2014/0339826 | A1 | 11/2014 | Ko et al. |
| 2014/0353971 | A1* | 12/2014 | Davey ................... F16C 32/044 290/52 |
| 2015/0252547 | A1 | 9/2015 | Ives |
| 2015/0316021 | A1 | 11/2015 | Dunne et al. |
| 2017/0207680 | A1 | 7/2017 | Power et al. |
| 2017/0356417 | A1 | 12/2017 | Doyle |
| 2017/0356492 | A1* | 12/2017 | Post .................... F16C 32/0417 |
| 2018/0009512 | A1 | 1/2018 | Dunne et al. |
| 2018/0087484 | A1 | 3/2018 | Schurtenberger |
| 2018/0291867 | A1 | 10/2018 | Cook et al. |
| 2018/0306166 | A1 | 10/2018 | Küster |

FOREIGN PATENT DOCUMENTS

| | | |
|---|---|---|
| EP | 1359320 | 11/2003 |
| EP | 3315804 | 5/2018 |
| EP | 2951356 | 7/2018 |
| FR | 3003310 | 9/2014 |
| GB | 2447514 | 9/2008 |
| JP | 2005237128 | 9/2005 |
| JP | 2013130110 | 7/2013 |
| JP | 2015048844 | 3/2015 |
| WO | 2010017869 | 2/2010 |
| WO | 2014188015 | 11/2014 |
| WO | 2015080595 | 8/2015 |
| WO | 2016086328 | 6/2016 |
| WO | 2016130984 | 8/2016 |
| WO | 2019008372 | 1/2019 |

OTHER PUBLICATIONS

International Search Report, PCT/CA2020/050049 filed on Jan. 17, 2020.

* cited by examiner

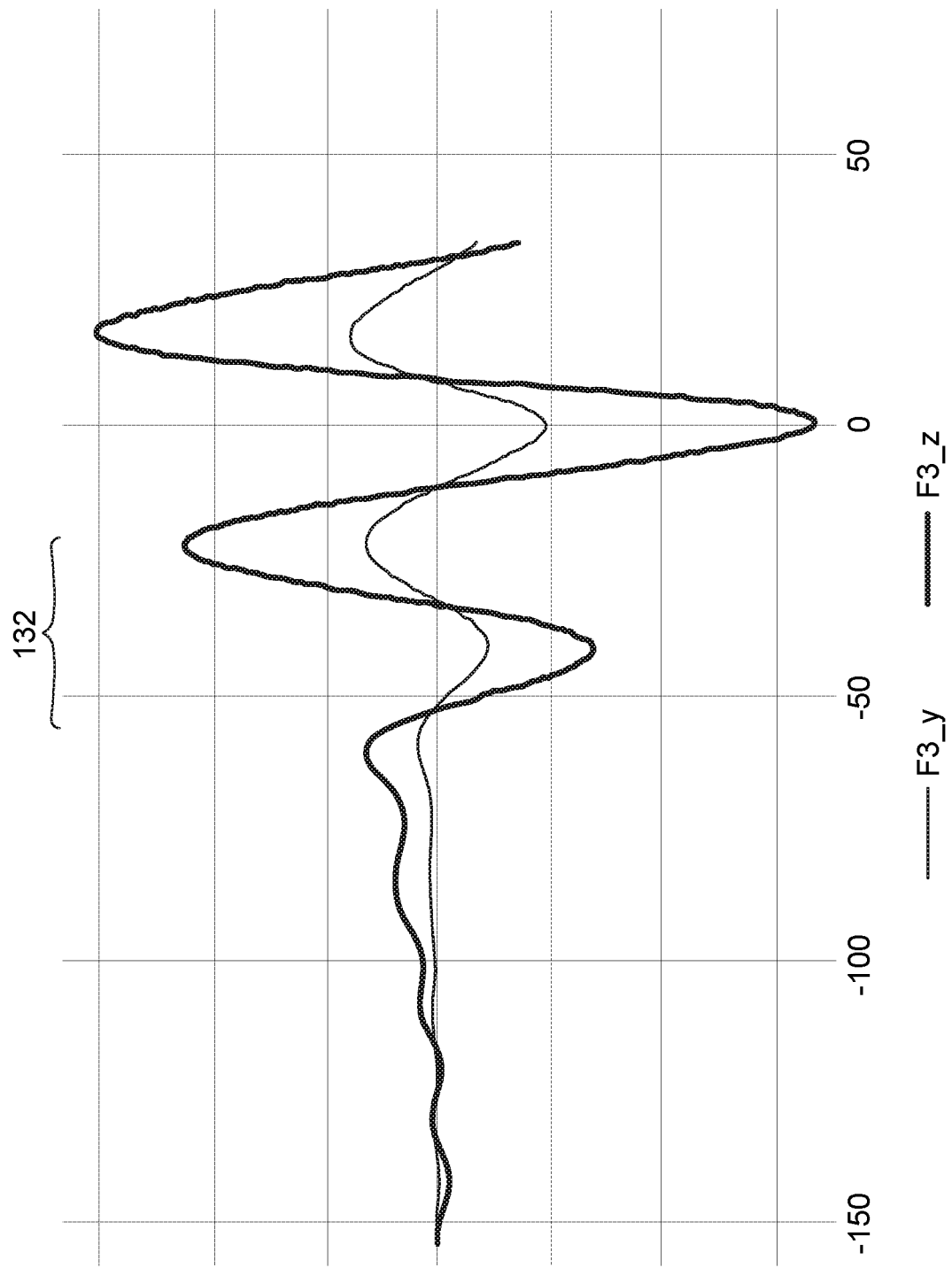

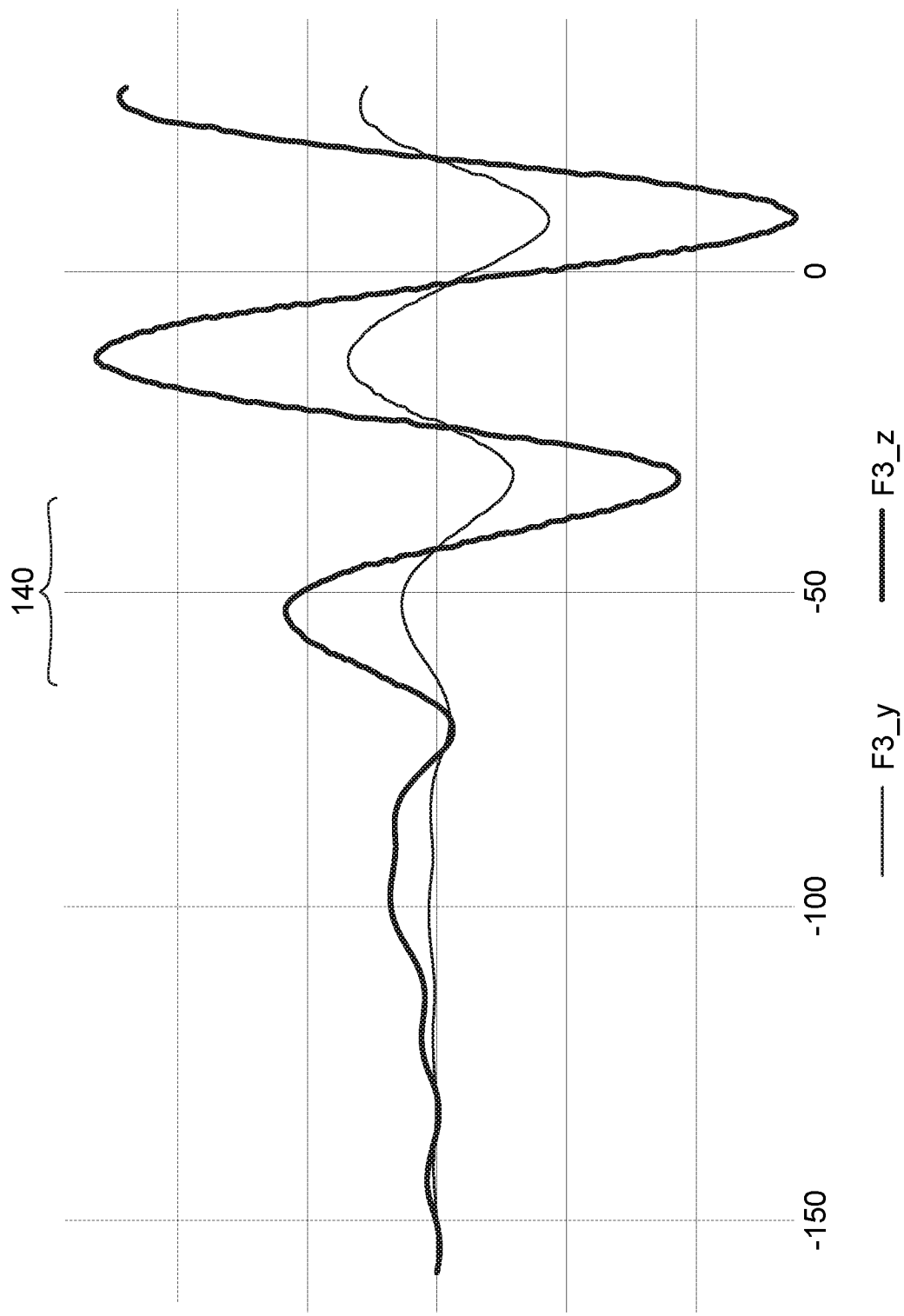

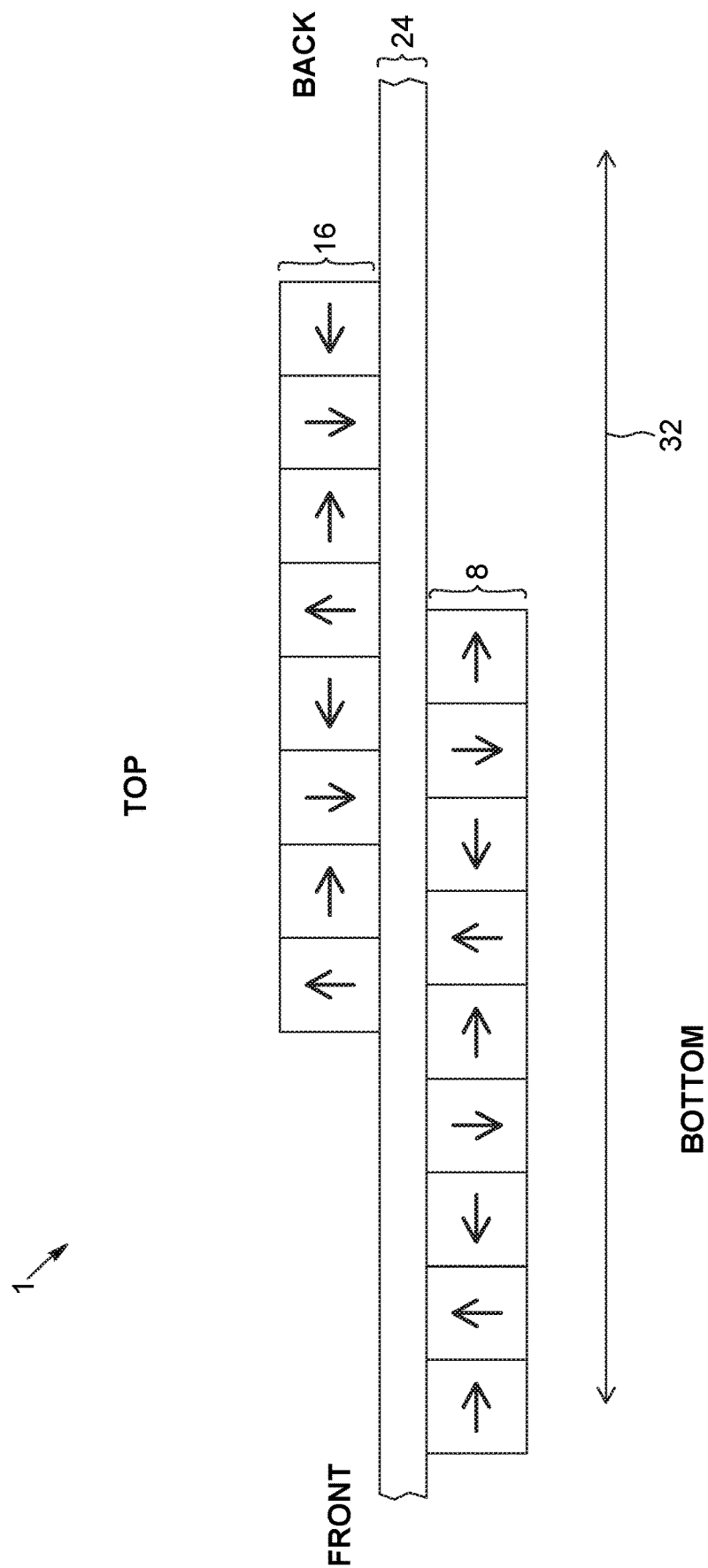

PASSIVE MAGNETIC BEARING AND ROTATING MACHINERIES INTEGRATING SAID BEARING, INCLUDING ENERGY PRODUCTION TURBINES

RELATED PATENT APPLICATION

The present application claims priority from U.S. provisional patent application No. 62/794,164, filed Jan. 18, 2019 and entitled "PASSIVE MAGNETIC BEARING AND ROTATING MACHINERIES INTEGRATING SAID BEARING, INCLUDING ENERGY PRODUCTION TURBINES", the disclosure of which is hereby incorporated by reference in its entirety.

TECHNICAL FIELD

The present disclosure generally relates to a passive magnetic bearing for rotating machineries and rotating machineries integrating the bearing. More particularly, the passive magnetic bearing and the rotating machineries are to be exposed to load(s) that is(are) caused by a fluid flow or any other force(s) applied to the bearing and the rotating machineries. The passive magnetic bearing and rotating machineries are configured to counteract the three (3) states dimensional forces applied on them, which can include forces in three directions. The passive magnetic bearing and rotating machineries are applicable primarily to energy production turbines using any type of fluid, and more particularly, those that can benefit from using a passive magnetic bearing. The passive magnetic bearing includes among other characteristics, a set of ring elements that have multi-axial characteristics.

BACKGROUND

The design of a three (3) states dimensional passive magnetic bearing ("PMB") is restricted by physical principles as described by Earnshaw's Theorem, dating back to the early 1800s. The Theorem asserts the impossibility of constructing a stable, non-contacting, electrostatic or magnetostatics levitation system using only fixed charges or fixed magnetic poles, such as those produced by PMB. Thus, a simple PMB design for one (1) axis, needs an additional active magnetic bearings ("AMB") to stabilize the other two (2) axes. When the simple PMB is used in rotating machineries, such machineries have always three (3) axis to stabilize: i) one being the vertical axis or weight (Axis-Y); ii) one being the axial axis or often thrust (Axis-Z) and the third iii) being side-to-side axis that is perpendicular the axial axis and vertical axis, being (Axis-X). Therefore Earnshaw's theorem teaches that rotating machineries cannot be maintained in a stable stationary equilibrium with the state of the art or a configuration solely maintained by the electrostatic interaction of the charges as known to the art:

The Maxwell equations, for static fields, lead to Laplace's equation, which states that an electrical force F(r) deriving from a potential U(r) there will always be no divergence, accordingly:

$$\nabla \cdot F = \nabla \cdot (-\nabla U) = -\nabla^2 U = 0.$$

And in x, y and z cartesian coordinates, that would lead to the sum of all the forces as follow:

$$\frac{\partial}{\partial_X} F_X + \frac{\partial}{\partial_Y} F_Y + \frac{\partial}{\partial_Z} F_Z = 0.$$

In order to contain a charged particle at a given position, the sum of all the forces at this position should be equal to zero and, any displacement from the equilibrium position should be counteracted by a restoring force in the opposite direction:

$$F_x = -kx$$

The Laplace equation directly shows that the stiffness constant "k" cannot have a negative sign in all three directions, i.e. the charge cannot be contained in all directions.

Because of the constraint imposed by Earnshaw's Theorem, virtually all currently available commercial magnetic bearing systems are of the AMB type, employing electromagnets that are powered by electronic amplifiers, the inputs to which come from field sensors and transducers embedded in and around the bearing system environment and monitoring the two (2) other axis of the rotating machineries.

These sensors and transducers form a feedback closed-loop system that operate at relatively high frequencies by using analog and/or digital adaptive PID systems embedded in the amplifiers to keep the levitated rotating machineries parts of the bearing stable and centered around their respective axis.

Due to the complexity of such system, AMBs are: i) expensive; ii) require periodic maintenance; iii) continuously consume electrical power to energize their amplifiers, their electromagnets and their sensors and transducers; iv) their integration reduces reliability and increases the failure probability and associated downside.

An example of a state of the art review and such approach using AMB to overcome Earnshaw's Theorem is described by US publication number: 20110001379 A1. This example publication shows that one (1) axis is stabilized by a PMB and the second axis uses AMB to control the axial rotor position.

SUMMARY

According to one aspect, there is provided a passive magnetic bearing that includes:
  a first ring element having an axial depth and being formed of magnetic material, the first ring element further having a Halbach array, the Halbach array being constant about a circumference of the first ring element;
  a second ring element having an axial depth and being formed of magnetic material, the second ring element being substantially concentric with the first ring element and being positioned relative to the first ring element within an operating range defined in an axial direction, the second ring element having:
    a first Halbach array extending angularly over a first set of at least one angular region of the second ring element; and
    a second Halbach array extending angularly over a second set of at least one angular region of the second ring element;
  wherein the first ring element is rotatable about the second ring element; and
  wherein the magnetic interaction from the Halbach array of the first ring element with the first and second Halbach arrays of the second ring element, when positioned relative to each other within the operating range defined in the axial direction, defines a combined force curve having:
    an axial component in the axial direction substantially matching a predetermined target axial force curve; and a radial component in the radial direction at a predetermined angular position substantially matching a predetermined target radial force curve.

According to one aspect, there is provided a passive magnetic bearing that includes:

a first ring element having an axial depth and being formed of magnetic material, the first ring element further having a Halbach array, the Halbach array arrangement being constant about a circumference of the first ring element;

a second ring element having an axial depth and being formed of magnetic material, the second ring element being substantially concentric with the first ring element and being substantially aligned in an axial direction with the first ring element, the second ring element having:

a first Halbach array extending angularly over a first set of at least one angular region of the second ring element; and a second Halbach array extending angularly over a second set of at least one angular region of the second ring element;

wherein the first ring element is rotatable about the second ring element; and wherein the magnetic interaction from the varying Halbach array of the first ring element with the first and second varying Halbach arrays of the second ring element when the first ring element and the second ring element are substantially aligned defines a combined force having:

an axial component in the axial direction substantially matching a predetermined target axial force; and a radial component in the radial direction at a predetermined angular position substantially matching a predetermined target radial force.

According to another aspect, there is provided a turbine for deployment within an operating environment having a fluid flow for generating torque. The turbine includes a stator, a rotor rotatable about the stator and a set of at least one passive magnetic bearing according to various example embodiments described herein, the first ring element of the passive magnetic bearing of the set being integrated within the rotor and the second ring element of the passive magnetic bearing of the set being integrated within the stator.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 7A illustrates a graph showing in multi-mode, the axial components and the radial components as measured using a test bench as a function of the position along the axial direction of a physical segment of a first magnetic ring element relative to a physical segment of a first Halbach array of second magnetic ring element;

FIG. 8A illustrates a graph showing in multi-mode, the axial components and the radial components as measured using the test bench as a function of the position along the axial direction of a physical segment of a first magnetic ring element relative to a physical segment of a second Halbach array of second magnetic ring element;

FIG. 8B illustrates a cross-sectional view showing a partial overlap of the first ring element and a second Halbach array of the second ring element according to one example embodiment;

DETAILED DESCRIPTION

Figure 1A:
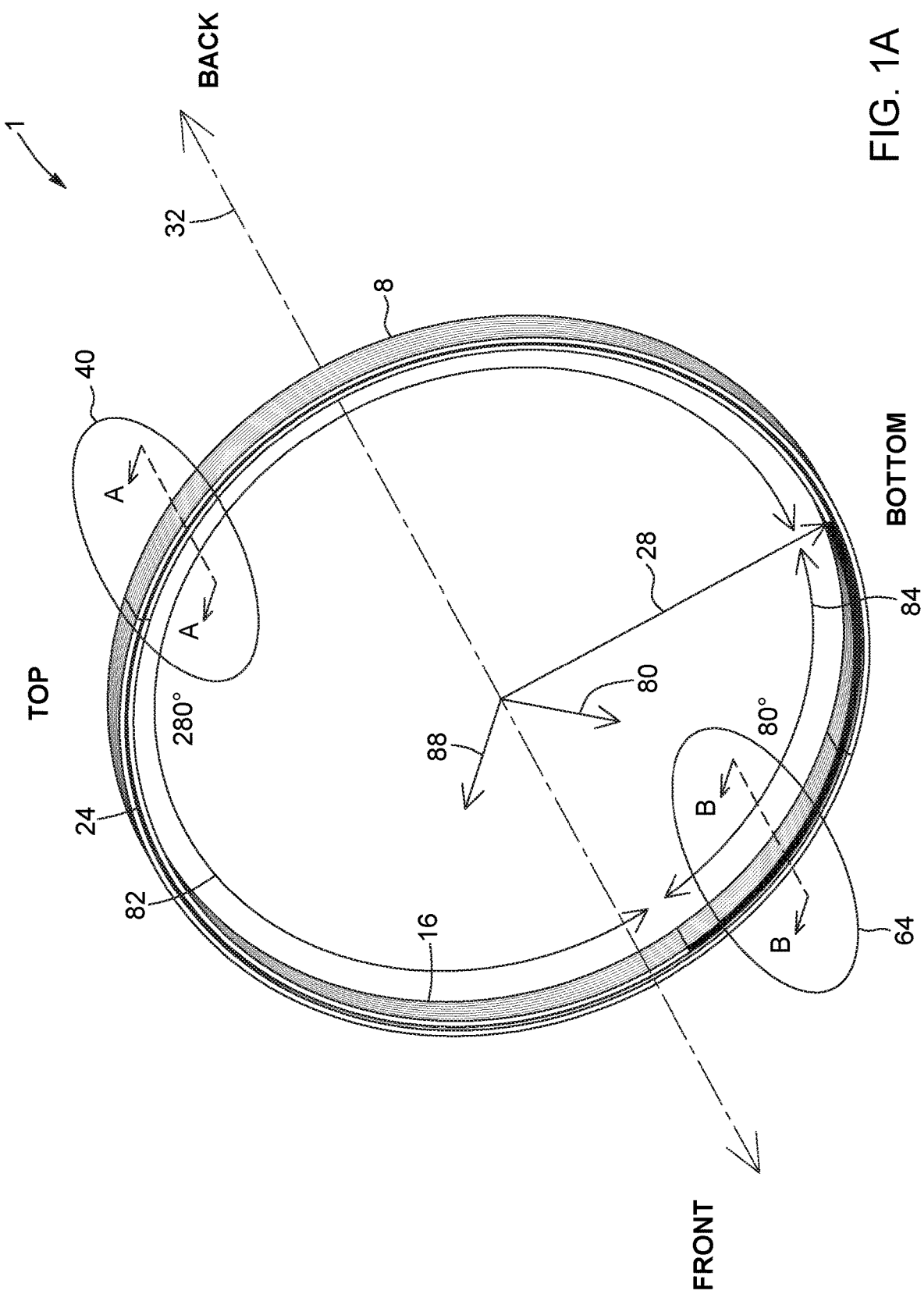
FIG. 1A illustrates a perspective view of an improved PMB according to one example embodiment.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art, that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The word "a" or "an" when used in conjunction with the term "comprising" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled" or "coupling" as used herein can have several different meanings depending on the context in which these terms are used. For example, the terms coupled or coupling can have a mechanical or electrical or magnetic connotations or a combination of the above. For example, as used herein, the terms coupled or coupling can indicate that two elements or devices are directly connected to one another or connected to one another through one or more intermediate elements or devices via an electrical element, electrical signal, magnetic field or a mechanical element depending on the particular context.

Broadly speaking, embodiments presented herein are directed to an improved PMB. The improved PMB includes substantially concentric magnetic ring elements each having respective at least one Halbach array. One of the magnetic ring elements has different Halbach arrays over various angular ranges thereof. One of the magnetic ring elements is configured to be non-fixed or substantially levitated while in operation while being subjected simultaneously to external forces. The magnetic interaction between the magnetic ring elements causes forces on the non-fixed magnetic ring element such that this non-fixed magnetic ring element is maintained within a positional range during operation while being freely rotatable. This property is obtained by using loopholes in Earnshaw's Theorem, such as using of internal and/or external environmental forces as counteracting forces on the non-fixed magnetic ring element during operation.

According to one example embodiment, the non-fixed magnetic ring element can be substantially stationary during operation. For example, a target position can be defined in the vertical axis (Y-axis), axial axis (Z-axis) and side-to-side axis (X-axis). An amount of deviation from the target position is permitted. Such deviation can be caused by a change in the external forces applied on the improved PMB, such as a change in the fluid flow in the operating environment or any similar additional force to the normal operational forces. The deviation can include translation along the Z-axis as well as movements along the Y-axis and X-axis. The improved PMB according to this single-mode embodiment can be configured so that the non-fixed magnetic ring reverts to the target position when any such positional deviation occurs.

According to another example embodiment, the non-fixed magnetic ring element can be positioned within an operating range. In particular, the operating range can be defined in the axial Z-axis direction. A target position can also be defined along the Y-axis and the X-axis. Some deviation along the Y-Axis and the X-axis is also permitted. Accordingly, the non-fixed magnetic ring element is translatable along the Z-axis within the operating range during operation. The non-fixed magnetic ring element can have at least two modes of operation, each mode corresponding to a respective defined operating position within the operating range. The improved PMB according to this multi-mode embodiment can be configured so that the non-fixed magnetic ring operates at a plurality of positions within the defined operating positions (ex: along the Z-axis) depending on changes in the force of the fluid flow in the operating environment, or any similar additional force to the normal operational forces. The improved PMB can also be configured so that the non-fixed magnetic ring reverts to the target position when there are deviations from the target position defined in the Y-axis and X-axis.

Referring now to FIG. 1A, therein illustrated is a perspective view of an improved PMB 1 according to one example embodiment. The improved PMB 1 is notionally represented by its "top", "bottom", "front", and "back" portions. These should be taken in the context of the figures only and should not be considered limiting. More particularly, they correspond to the position and orientation of the improved PMB when operationally deployed in the real world. The bottom portion refers to a portion that is closest to a ground plane and top portion is opposite the bottom portion. The front refers to a surface or direction of the improved PMB 1 facing against an external force(s), such as facing against a fluid flow or external force(s) otherwise generated. The back of the improved passive magnetic bearing 1 is opposite the front thereof.

The improved PMB 1 can be denoted using a three-axis notation (three mutually perpendicular axes), in which the axial direction 32 denotes a first axis (or "Z" Axis). A second (vertical) axis corresponds to a top-bottom axis 80. In real-world operation, this axis corresponds to the orientation of gravity (or "Y" Axis). A third (side-to-side) axis 88 is perpendicular to both the axial direction 32 and the vertical axis 80. It will be appreciated that the third axis 88 (or "X" Axis) corresponds to a side to side direction of the improved PMB 1.

Figure 1B:
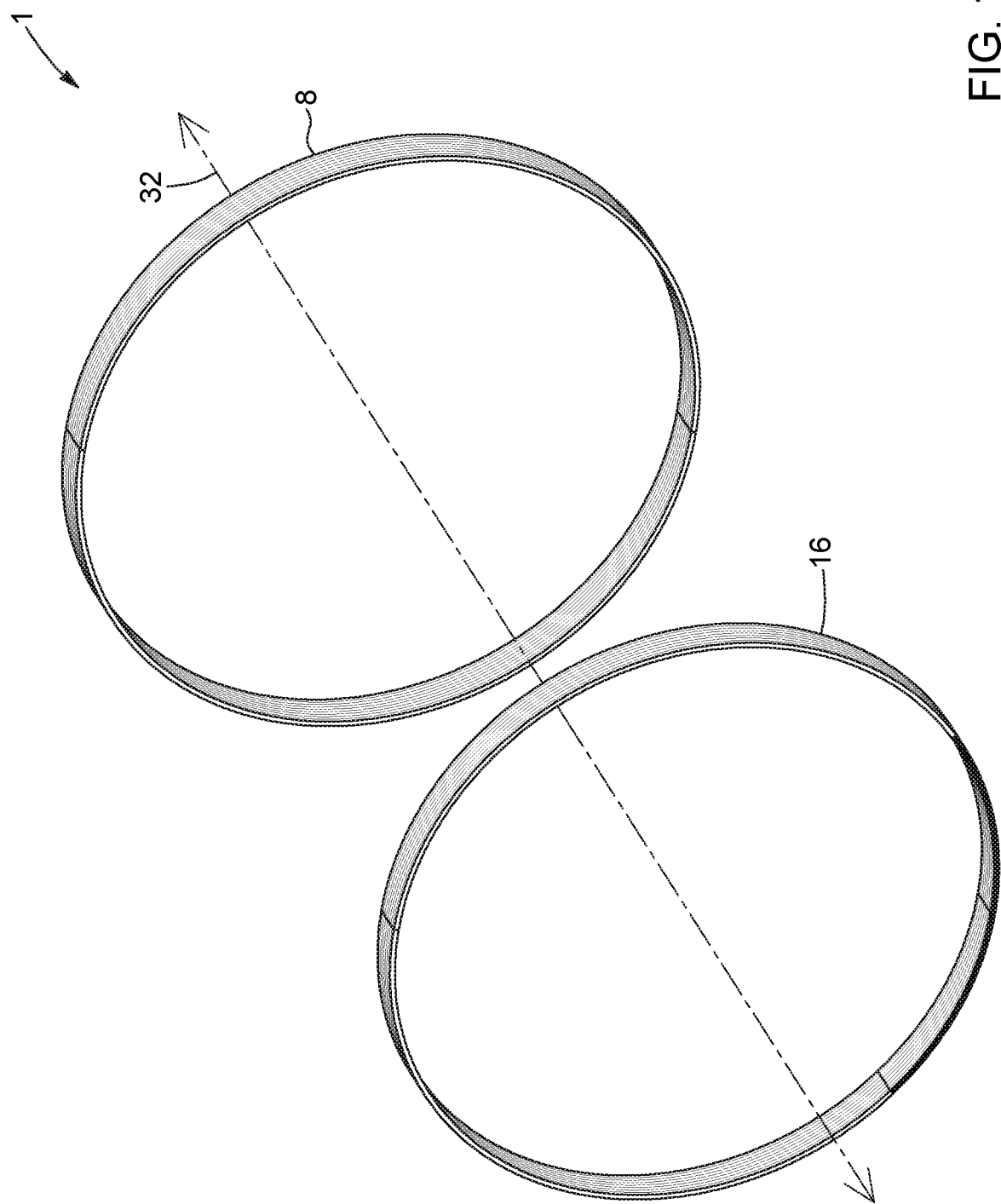
FIG. 1B illustrates an exploded view of the improved PMB according to one example embodiment.

The improved PMB 1 includes a first magnetic ring element 8 and a second magnetic ring element 16. FIG. 1A shows the first magnetic ring 8 and the second magnetic ring element 16 overlapping along the axial Z-axis direction, which corresponds to an operational configuration. FIG. 1B is an exploded view of the improved PMB 1 to better show individual characteristics of each ring element 8 and 16. The first magnetic ring element 8 and the second magnetic ring element 16 can be substantially concentric relative to one another, which corresponds to a target position in the X-axis and Y-axis. However, some deviations along the X-axis and/or Y-axis are permitted, which can cause the first magnetic ring element 8 and the second magnetic ring element 16 to operate in a slightly non-concentric relative position. The first magnetic ring element 8 and the second magnetic ring element 16 are spaced apart in a radial direction from one another to define a radial operational gap 24 therebetween. The gap 24 extends in a radial direction 28 of the improved PMB 1. It will be appreciated that since the first magnetic ring element 8 and the second magnetic ring element 16 can be non-concentric during operation due to deviations from a target position, the gap 24 can be varying during operation.

One of the magnetic ring elements is freely rotatable about a common axis 32 of the ring elements relative to the other of the magnetic ring elements. It will be appreciated that maintaining an adequate gap 24 (substantially fixed gap, but with some variance) between the concentric ring elements 8, 16 allows the rotation of the freely rotatable (non-fixed) ring element to be substantially frictionless relative to the other PMB ring element. That is, the freely rotatable magnetic ring element can rotate about the common axis 32 without frictionally contacting the other ring element. Within the illustrated example, the first magnetic ring element 8 is an outer ring and it is freely rotatable about the second magnetic ring element 16 being an inner ring element.

When the improved PMB 1 is applied to an operational device such as rotating machinery using fluid, water, wind, air, gas, or steam or any torque generating source, the freely rotatable ring element is integrated with the rotating part operational device. This rotating part may be a rotor. The other ring element is integrated with the non-rotating part of the operational device. This non-rotating part may be a stator. More particularly, the operational device has a set of elements (such as the stator and the ring element integrated thereto) which are fixed to an external body, such as the ground, through the structure of the operational device. The operational device also has another set of elements (such as the rotor and the freely rotatable ring element) that are not fixed to the external body.

It will be understood that in other examples, the operational device can be a simple bearing (does not generate electricity) that integrates the first and second ring elements of the improved PMB 1.

Each of the first magnetic ring element 8 and the second magnetic ring element 16 has an axial depth (i.e. a depth (or length/dimension) in the axial direction 32). Each of the first magnetic ring element 8 and the second magnetic ring element 16 further has at least one respective Halbach array. The Halbach array of the first and second magnetic ring elements 8 and 16, respectively, are varying in that the arrangement of permanent magnets forming the arrays and the magnetic fields created by them are varying in the three states coordinates directions of the three axis, including axis 32 of the improved PMB 1.

The varying Halbach array of the first magnetic ring element 8 and the varying Halbach array of the second magnetic ring element 16 at a first angular position have a mutual magnetic interaction. The first angular position can be in a top-wise portion of the improved PMB 1. The specific interaction of varying Halbach arrays of the magnetic ring elements 8 and 16 creates a repelling force at the first angular position between the magnetic ring elements 8 and 16. The repelling force is experienced by the freely rotatable first magnetic ring element 8.

The specific magnetic interaction at the first angular position caused by the varying Halbach arrays of the magnetic ring elements 8 and 16 can be characterized as a first force F 60 (FIG. 2) that is applied onto the first magnetic ring element 8. This force contributes to a stiffness model of the first magnetic ring element 8. It was observed that the specific magnetic interaction at the first angular position from the magnetic patterns of the varying Halbach arrays of the magnetic ring elements 8 and 16 causes a force F 60 on the first magnetic ring element 8 that has a first force component 61 in the axial direction 32 and a second force component 62 in a radial direction 28 of the improved PMB 1. The first component 61 is oriented towards the notional front of the improved PMB 1. The radial component 62 is oriented away from the second ring member 16, showing that the first ring member 8 is being repelled by the second ring member 16 at the first angular position. The radial component 62 is oriented in the direction of the notional top of the improved PMB 1. The radial component 62 can be aligned with the vertical Y-axis of the improved PMB 1.

According to some example embodiments, the first force component 61 in the axial direction 32 can be variable. This force component 61 can vary depending on the relative position of the first ring element 8 relative to the second ring element 16 along the axial direction (Z-axis). A change in relative positions of the first and second ring elements 8 and 16 can affect the magnetic interaction therebetween, thereby also varying the force component 61 along the Z-axis 32. The variance of the force component 61 can be useful to adjust operation due to changing force of the fluid flow.

According to some example embodiments, the second force component 62 in the radial direction 28 can be variable. Accordingly, the repelling force experienced by the freely rotatable first magnetic ring element 8 can be variable. This force component 62 can also vary depending on the relative position of the first ring element 8 relative to the second ring element 16 along the axial direction (Z-axis). A change in relative positions of the first and second ring elements 8 and 16 can affect the magnetic interaction therebetween, thereby also varying the force component 62 along the Y-axis 80. The variance of the force component 62 can be useful to adjust operation due to changes in external forces applied to the non-fixed ring element, such as varying hydrostatic forces.

Of course, if the first ring element 8 and the second ring element 16 are maintained at a substantially constant relative position along the axial Z-axis direction, then the force F 60 and its axial component 61 and radial component 62 will also be substantially constant because the magnetic interaction between the ring elements 8 and 16 will remain constant.

Returning to FIGS. 1A and 1B, the Halbach array of the first magnetic ring element 8 can be constant about the entire circumference of the first magnetic ring element 8. This is illustrated in FIG. 1 by the first magnetic ring element 8 having the same shading about its circumference (no shading pattern for first magnetic ring element in FIGS. 1A and 1B). It will be understood that the Halbach array of the first magnetic ring element is constant about the entire circumference in that taking a cross-section at any angular position about the axis 32 may show the same Halbach array characteristics, such as the same Halbach array of permanent magnetic elements of the first magnetic ring element 8.

In other embodiments, the Halbach array of the first magnetic ring element 8 can be variable from one application to another in all three directions, but constant about its circumference.

The varying Halbach array of the second magnetic ring element 16 is non-constant about the circumference of the second magnetic ring element 16. The second magnetic ring element 16 has a first varying Halbach array that extends over a first set of at least one angular region (as illustrated by a first shading pattern in the rim of the ring element 16) and a second varying Halbach array that extends over a second set of at least one angular region (as illustrated by a second shading pattern in the rim of the ring element 16). The varying magnetic pattern of the first varying Halbach array is different from the varying magnetic pattern of the second varying Halbach array. This is illustrated in FIGS. 1A and 1B by the second magnetic ring element 16 having differently shaded angular regions, each region corresponding to one of the varying Halbach arrays.

The varying Halbach array of the first magnetic ring element 8 and the second varying Halbach array of the second magnetic ring element 16 at the second angular position have a mutual magnetic interaction. The second angular position can be a bottom-wise portion of the improved PMB 1. Due to the second varying Halbach array of the second magnetic ring element 16 being different at the second angular position, the specific interaction between the first and second magnetic ring elements 8 and 16 is also different at the second angular position. The interaction of varying Halbach arrays of the ring elements 8 and 16 at the second angular position is an attracting force between the ring elements 8 and 16.

The specific magnetic interaction at the second angular position caused by the varying Halbach arrays of the ring elements 8 and 16 can be characterized as a second force F 72 (FIG. 3) that is applied onto the first magnetic ring element 8. This force contributes to a stiffness model of the first magnetic ring element 8. It was observed that the specific magnetic interaction at the second angular position from the magnetic patterns of the varying Halbach arrays of the ring elements 8 and 16 causes the second force F 72 on the first magnetic ring element 8 that has a first force component 73 in the axial direction 32 and a second force component 74 in a radial direction 28 of the improved PMB 1. The first force component 73 is oriented towards the notional front of the improved PMB 1. The radial force component 74 is oriented towards the second ring member 16, showing that the first ring member 8 is being attracted by the second ring member 16 at the second angular position within the second angular region 64. Due to the variable attraction force occurring at a bottom portion of the first ring member 8, the radial component 74 is oriented in the direction of the notional top of the improved PMB 1. The radial component 74 can be aligned with the vertical Y-axis of the improved PMB 1.

According to some example embodiments, the first force component 73 in the axial direction 32 can be variable. This force component 73 can vary depending on the relative position of the first ring element 8 relative to the second ring element 16 along the axial direction (Z-axis). A change in relative positions of the first and second ring elements 8 and 16 can affect the magnetic interaction therebetween, thereby also varying the force component 73 along the Z-axis 32. The variance of the force component 73 can be useful to adjust operation due to changing force of the fluid flow or any similar additional force to the normal operational forces.

According to some example embodiments, the second force component 74 in the radial direction 28 can be variable. Accordingly, the attracting force experienced by the freely rotatable first magnetic ring element 8 can be variable. This force component 74 can also vary depending on the relative position of the first ring element 8 relative to the second ring element 16 along the axial direction (Z-axis). A change in relative positions of the first and second ring elements 8 and 16 can affect the magnetic interaction therebetween, thereby also varying the force component 74 along the Y-axis 80. The variance of the force component 74 can be useful to adjust operation due to changes in external forces applied to the non-fixed ring element, such as varying hydrostatic forces.

Of course, if the first ring element 8 and the second ring element 16 are maintained at a substantially constant relative position along the axial Z-axis direction, then the force F 72 and its axial component 73 and radial component 74 will also be substantially constant because the magnetic interaction between the ring elements 8 and 16 will remain constant.

In the illustrated example embodiment of FIG. 1A, the first varying Halbach array of the second magnetic ring element 16 extends over a single axial region corresponding to a top portion of the second magnetic ring element 16. In the illustrated example, the first varying Halbach array extends over a top-wise angular region 82. This top-wise angular region 82 includes the first angular region 40. In this illustrated example, this top-wise region 82 extends over an approximately 280-degree arc of the second magnetic ring element 16. Within this top-wise angular region 82, the first magnetic ring element 8 can have a repelling magnetic interaction with the second magnetic ring element 16, such as from the combination of magnetic patterns of the varying Halbach arrays of the magnetic ring elements 8 and 16 illustrated in FIG. 2. Notwithstanding the above, the top-wise region 82 can have a region that is different from 280-degree arc.

Continuing with FIG. 1A, the second varying Halbach array of the second magnetic ring element 16 extends over a single axial region corresponding to a bottom portion of the second magnetic ring element 16. In the illustrated example, the second varying Halbach array of the second set extends over a bottom-wise angular region 84. The second varying Halbach array in this bottom-wise angular region 84 is different from the first varying Halbach array in the top-wise angular region 82. The bottom-wise angular region includes the second angular position 64. In this illustrated example, this bottom-wise region extends over an approximately 80 degrees arc of the second magnetic ring element 16. Within this bottom-wise angular region 84, the first magnetic ring element 8 can have an attracting magnetic interaction with the second magnetic ring element 16, such as from the combination of magnetic patterns of the varying Halbach arrays of the magnetic ring elements 8 and 16 illustrated in FIG. 3. Notwithstanding the above, the bottom-wise region 84 can have a region that is different from 80-degrees arc.

The improved PMB 1 can be symmetrical about the top-bottom axis 80 so that its "left" side can be congruent to its "right" side. The improved PMB 1 being symmetrical creates a zero-force in either directions of the side-to-side X-axis.

In other example embodiments, the improved PMB 1 can be asymmetrical about the top-bottom axis 80 so that its "left" side is not congruent to its "right" side. The improved PMB 1 being asymmetrical creates non-zero forces in the side-to-side X-axis, which may be useful to counter external forces (such as where there is a sidewise component in an external fluid flow force).

As described elsewhere herein, at a given relative position of the first ring element 8 with the second ring element 16 along the Z-axis 32, the first force F 60 (FIG. 2) has a first component 61 in the axial direction 32 oriented towards a notional front of the improved PMB 1 and a second force component 62 along the top-bottom axis 80 in a direction of the notional top of the improved PMB 1 (from the repelling force). It will be understood that at the given relative position along the Z-axis 32, this first force F 60 is present at any point along the first angular region 82, although the exact orientation will vary depending on the exact angular position.

Also, at the given relative position of the first ring element 8 with the second ring element 16 along the Z-axis, the second variable force F 72 (FIG. 3) has a first force component 73 in the axial direction 32 also oriented towards a notional front of the improved PMB 1 and a second force component 74 along the top-bottom axis 80 also in the direction of notional top of the improved PMB 1 (from the attracting force). It will be understood that at the given relative position along the Z-axis 32, this second force F 72 is present at any point along the second angular region 84, although the exact orientation will vary depending on the exact angular position.

Furthermore, at the given relative position of the first ring element 8 with the second ring element 16 along the Z-axis, the sum of the forces F 60 along the top-wise angular region 82 of the first magnetic ring element 8 combined with the sum of the forces F 72 along the bottom-wise angular region 82 of the second magnetic ring element 16 define a combined force on the first magnetic ring element 8 from the magnetic interaction of the entirety of the first magnetic ring element 8 and the entirety of the second magnetic ring element 16. It was observed and measured that when the angularly-constant Halbach array of the first magnetic ring element 8, and the first and second Halbach arrays of the second magnetic ring element 16 are appropriately designed, the magnetic interaction of the first magnetic ring element 8 and the second magnetic ring element 16 can be defined as a combined force having a defined axial component along the axis 32 of the improved PMB 1 and a defined radial component along the top-bottom axis 80 of the improved PMB 1. This radial component is defined at a specific angular position corresponding to the top-bottom Y-axis 80. These components of the combined forces are representative of the force on the first magnetic ring element 8 along the axis 32 and of the force on the first magnetic ring element 8 along the top-bottom axis 80.

According to one example embodiment, and as described elsewhere herein, the improved PMB 1 is designed to have its first and second ring elements 8 and 16 operate a target position, which includes a target position along the axial Z-axis direction of the first ring element 8 relative to the second ring element 16. The target position can also be defined to have the ring elements 8 and 16 to be substantially concentric. It will be appreciated that in defining a target position, the first ring element 8 and the second ring element 16 are intended to be substantially aligned in the axial direction, the alignment corresponding to the target position along the axial Z-axis direction. This alignment also corresponds to the given relative position along the Z-axis mentioned in the preceding several paragraphs. As further described elsewhere herein, some deviation from the target position is permitted, such as some relative translation along the axial Z-axis direction.

It was further observed and measured that parameters of the first magnetic ring element 8 and the second magnetic ring element 16 can be appropriately selected (ex: during design of the improved PMB 1) so that when the first and second ring elements 8 and 16 are maintained at the target position (including being substantially aligned in the axial direction), the defined axial component of the combined force substantially matches a predetermined target axial force and the defined radial component at the specific angular position matches a predetermined target radial force.

According to another example embodiment, and as described elsewhere herein, the improved PMB 1 is designed to have its first and second ring elements 8 and 16 operate within an operating range. In particular, the operating range can be defined in the axial Z-axis direction. The operating range can also define a target position in the X-axis and Y-axis, such as having the first and second ring elements 8 and 16 be substantially concentric. It will be appreciated that in defining an operating range, the first ring element 8 and the second ring element 16 can have a plurality of relative positions (as mentioned in the preceding several paragraphs) along the axial Z-axis direction. That is, translation of the first ring element 8 relative to the second ring element 16 along the Z-axis is permitted within the operating range.

Accordingly, at each of the plurality of given relative positions of the first ring element 8 and second ring element 16 along the Z-axis within the operating range, the first force F 60 has a respective first component 61 in the axial direction 32 and a respective second force component 62 along the top-bottom axis 80. Similarly, at each of the plurality of given relative positions of the first ring element 8 and second ring element 16 along the Z-axis within the operating range, the second force F 72 has a respective first force component 73 in the axial direction 32 and a respective second force component 74 along the top-bottom axis 80. Because the magnetic interaction between the first and second ring elements 8 and 16 will be different for different relative positions along the Z-axis, the first force F 60 (and its components 61 and 62) and the second force F 72 (and its components 73 and 74) will vary according to the actual relative position. Accordingly, within the operating range defined along the axial Z-direction, the combined force of first force F 60 and second force F 72 defines a combined force curve.

It was further observed and measured that parameters of the first magnetic ring element 8 and the second magnetic ring element 16 can be appropriately selected (ex: during design of the improved PMB 1) so that when the first ring element 8 and the second ring element 16 are positioned relative to each other within the operating range defined in the axial Z-axis direction, the combined force curve has an axial component in the axial direction substantially matching a predetermined target axial force curve and a radial component substantially matching a predetermined target radial curve.

In one example embodiment, the predetermined target axial force curve can be variable for relative positions of the first and second ring elements 8 and 16. The predetermined target axial force curve can be set according to an expected range of external forces applied on the improved PMB 1 during operation.

In one example embodiment, the predetermined target radial force curve can be substantially constant (i.e. a flat curve) for relative positions of the first and second ring elements 8 and 16.

Within the defined operating range of relative positions of the first and second ring elements 8 and 16 along the Z-axis, there may further be at least two stable relative positions. In other embodiments, there may be more than two stable relative positions. At a first stable relative position of the first ring element and the second ring element in the axial direction, the first and second ring elements 8 and 16 have a substantially stable magnetic interaction. The stable magnetic interaction corresponds to the combined force caused by such interaction being substantially constant. Similarly, at a second stable relative position of the first ring element and the second ring element in the axial direction, the first and second ring elements 8 and 16 have another substantially stable magnetic interaction, which corresponds to another combined force.

According to various example embodiments described herein, the magnetic field characteristics of the Halbach array of the first ring element 8 is variable in the axial Z-axis direction 32. For example, the Halbach array of the first ring element is formed of a plurality of discrete magnets that are positioned in the axial direction and the discrete magnets have different magnet characteristics. Such magnet characteristics of the plurality of discrete magnets can include magnetic material, magnetic field orientation, magnetic field strength, magnet height, magnet width and magnet depth.

The magnetic field characteristics of the first Halbach array and the magnetic field characteristics of the second Halbach array of the second ring element 16 can also be variable in the axial Z-axis direction 32. For example, the first Halbach array of the second ring element is formed of a plurality of discrete magnets that are positioned in the axial direction and the second Halbach array of the second ring element is formed of another plurality of discrete magnets that are positioned in the axial direction. Each set of discrete magnets can have different magnet characteristics, such as one or more of magnetic material, magnetic field orientation, magnetic field strength, magnet height, magnet width and magnet depth.

Figure 2:
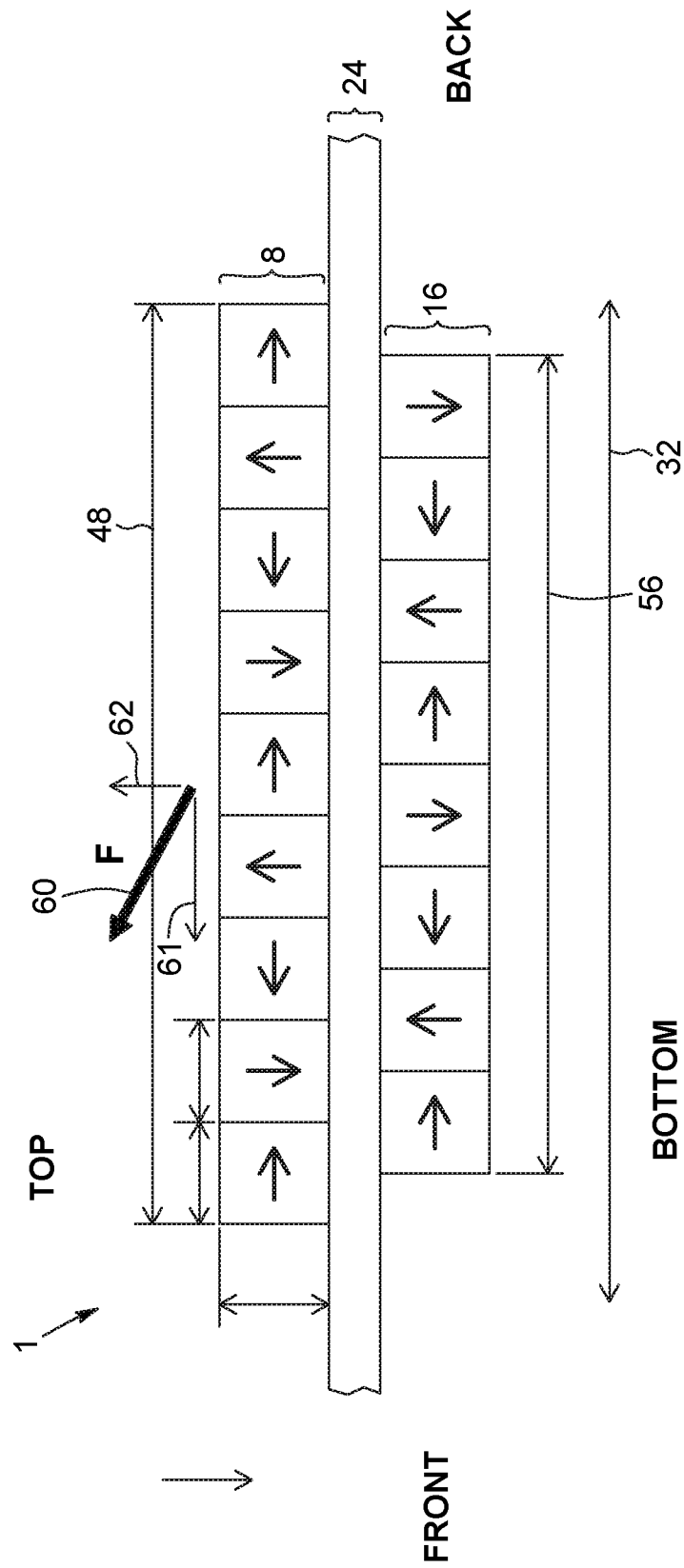
FIG. 2 illustrates a cross-sectional view along the line A-A at a first angular position of the improved PMB according to one example embodiment.

Referring now to FIG. 2, therein illustrated is a cross-sectional view along the line A-A (40 of FIG. 1) at a first angular position of the improved PMB 1 according to one example embodiment. The first angular position corresponds to an upper angular region 82 of the improved PMB 1. The varying Halbach array of the first magnetic ring element 8 at the first angular position and the varying Halbach array of the second magnetic ring element 16 at the first angular position according to the example embodiment are both illustrated in FIG. 2, only for the A-A cross-sectional view.

Each varying Halbach array is modeled and illustrated as a group of adjacently arranged permanent magnets each having a defined magnetic orientation representing its magnetic field. The permanent magnets are lined up in the axial Z-axis direction. In the illustrated example of FIG. 2, the varying Halbach array of the first magnetic ring element 8 has the following magnetic orientation pattern of 9 permanent magnetic elements (from left to right of FIG. 2): →↓←↑→↓←↑→. The varying Halbach array of the second magnetic ring element 16 has the following magnetic orientation pattern of 8 permanent magnetic elements (from left to right of FIG. 2): →↑←↓→↑←↓. In the example Halbach arrays illustrated in FIG. 2, due to the first magnetic ring element 8 having more permanent magnetic elements in the axial direction, it may have an axial depth 48 that is greater than the axial depth 56 of the second magnetic ring element 16. Notwithstanding the above, in the illustrated example of FIG. 2, the varying Halbach array of the first magnetic ring element 8 may have a pattern of any number of permanent magnetic elements other than nine (9). Similarly, the varying Halbach array of the second magnetic ring element 16 may have a pattern of any number of permanent magnet elements other than eight (8).

FIG. 2 illustrates a given relative position of the first ring element 8 with respect to the second ring element 16. This can correspond to a target position along the axial Z-axis direction. Alternatively, this relative position can correspond to a stable relative position within the operating range of relative positions of the first and second ring elements 8 and 16.

Within this relative position of the first and second ring elements, the magnetic interaction thereof at the first angular position 40 can be characterized by the first force F 60 having its axial force component 61 and second radial force component 62.

Figure 3:
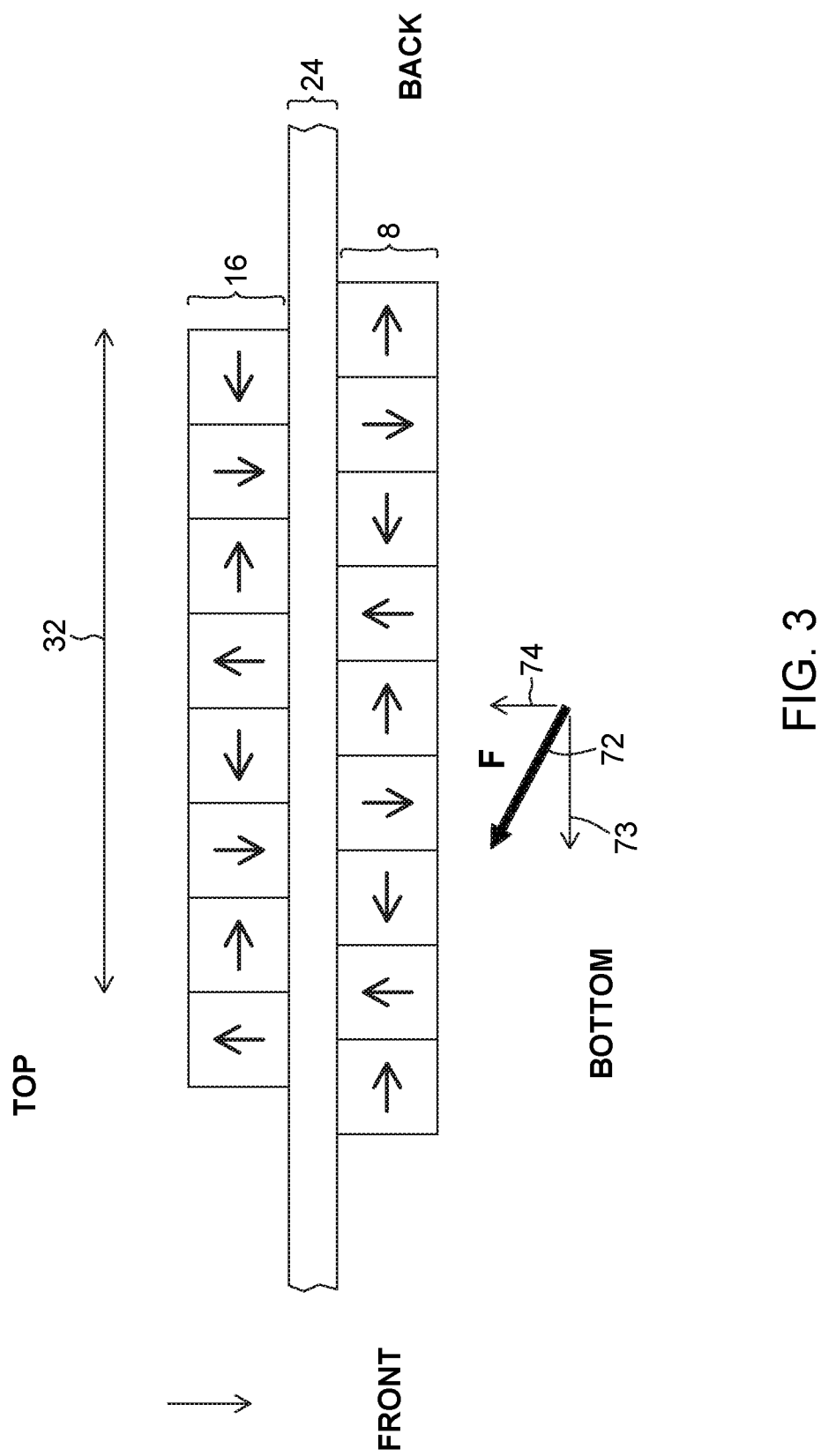
FIG. 3 illustrates a cross-sectional view along the line B-B at a second angular position of the improved PMB according to one example embodiment.

Referring now to FIG. 3, therein illustrated is a cross-sectional view along the line B-B (64 of FIG. 1) at a second angular position of the improved PMB 1 according to one example embodiment. The second angular position corresponds to a lower region 84 of the PMB 1. The varying Halbach array of the first magnetic ring element 8 at the second angular position and the varying Halbach array of the second magnetic ring element 16 at the second angular position are both illustrated in FIG. 3.

Like in FIG. 2, each varying Halbach array at the second angular position is modeled and illustrated as a group of adjacently arranged permanent magnets each having a defined magnetic orientation representing its magnetic field. In the illustrated example of FIG. 3, the varying Halbach array of the first magnetic ring element 8 has the following magnetic orientation pattern of 9 permanent magnetic elements (from left to right of FIG. 3): →↑←↓→↑←↓→. It will be appreciated that this is substantially the same pattern as the one at the first angular position (illustrated in FIG. 2) but has been inverted (i.e. mirrored about the axis 32) since the first magnetic ring element 8 is closer to the bottom at the lower region 64.

The varying Halbach array at the second angular position of the second magnetic ring element 16 has the following magnetic orientation pattern of 8 permanent magnetic elements (from left to right of FIG. 3): ↑→↓←↑→↓←. It will be appreciated that this pattern is different from magnetic pattern of the varying Halbach array of the second magnetic ring element 16 at the first angular position. Notwithstanding the above, in the illustrated example of FIG. 3, the varying Halbach array of the first magnetic ring element 8 may have a pattern of any number of permanent magnetic elements other than nine (9). Similarly, the varying Halbach array of the second magnetic ring element 16 may have a pattern of any number of permanent magnetic elements other than eight (8).

It will be appreciated that the second Halbach array of the second magnetic ring element 16 also has varying magnetic field characteristics along the axial Z-axis direction 32.

FIG. 3 illustrates a same relative position of the first ring element 8 with respect to the second ring element 16 as illustrated in FIG. 2. This can correspond to a target position along the axial Z-axis direction. Alternatively, this relative position can correspond to a stable relative position within the operating range of the first and second ring element 8 and 16 relative positions.

Within this relative position of the first and second ring elements, the magnetic interaction thereof at the second angular position 64 can be characterized by the first force F 72 having its radial force component 74 and second axial force component 73.

It will be understood that the following parameters can be variably selected and variably weighted/valued to influence the combined force or the combined force curve:
- the pattern of magnetic elements within the angularly constant variable Halbach array of the first magnetic ring element 8;
- the pattern of magnetic elements of the first variable Halbach array within the first set of at least one angular region of the second magnetic ring element 16;
- the position and size (ex: in degrees) of the first set of at least one angular region having the first variable Halbach array within the second magnetic ring element 16;
- the pattern of magnetic elements of the second variable Halbach array within the second set of at least one angular region of the second magnetic ring element 16;
- the position and size (ex: in degrees) of the second set of at least one angular region having the second variable Halbach array within the second magnetic ring element 16; and/or
- the magnetic material(s) forming the first and second magnetic ring elements 8 and 16.
- the operating position of element 8 versus element 16 in all axis can also be variable and/or fixed by design.

Other factors that can influence the variable combined forces include:
- Dimensions of the individual magnets forming the Halbach arrays;
- Duplex material used to house the magnets, alloy and dimensions;
- The method used to isolate and insulate the magnets from fluid or any external agent that may affect their performance in time within the first and second magnetic ring elements 8 and 16;
- The material used to isolate the magnets of first and second magnetic ring elements 8 and 16 housing and geometry.

Accordingly, it will be understood that FIGS. 1A, 2, and 3 and the associated description present the improved PMB 1 according to one possible example configuration. Other configurations of the improved PMB 1 are contemplated that can cause the PMB 1 to have the predetermined three axial forces or force curves within the target position or the operating range of relative axial positions of the first and second magnetic ring elements 8 and 16. More particularly, FIGS. 2 and 3 and the associated description provide a specific configuration of the magnetic pattern of the varying Halbach arrays of the magnetic ring elements 8 and 16 and it will be understood that other magnetic patterns of the arrays can be implemented. For example, the magnetic pattern can be duplicated or multiplicated in any direction (i.e. repeating or fractionally repeating the 9 magnetic elements of the first ring element 8 and the 8 magnetic elements of the second ring element 16). Alternatively, different magnetic patterns may be used.

Figure 5:
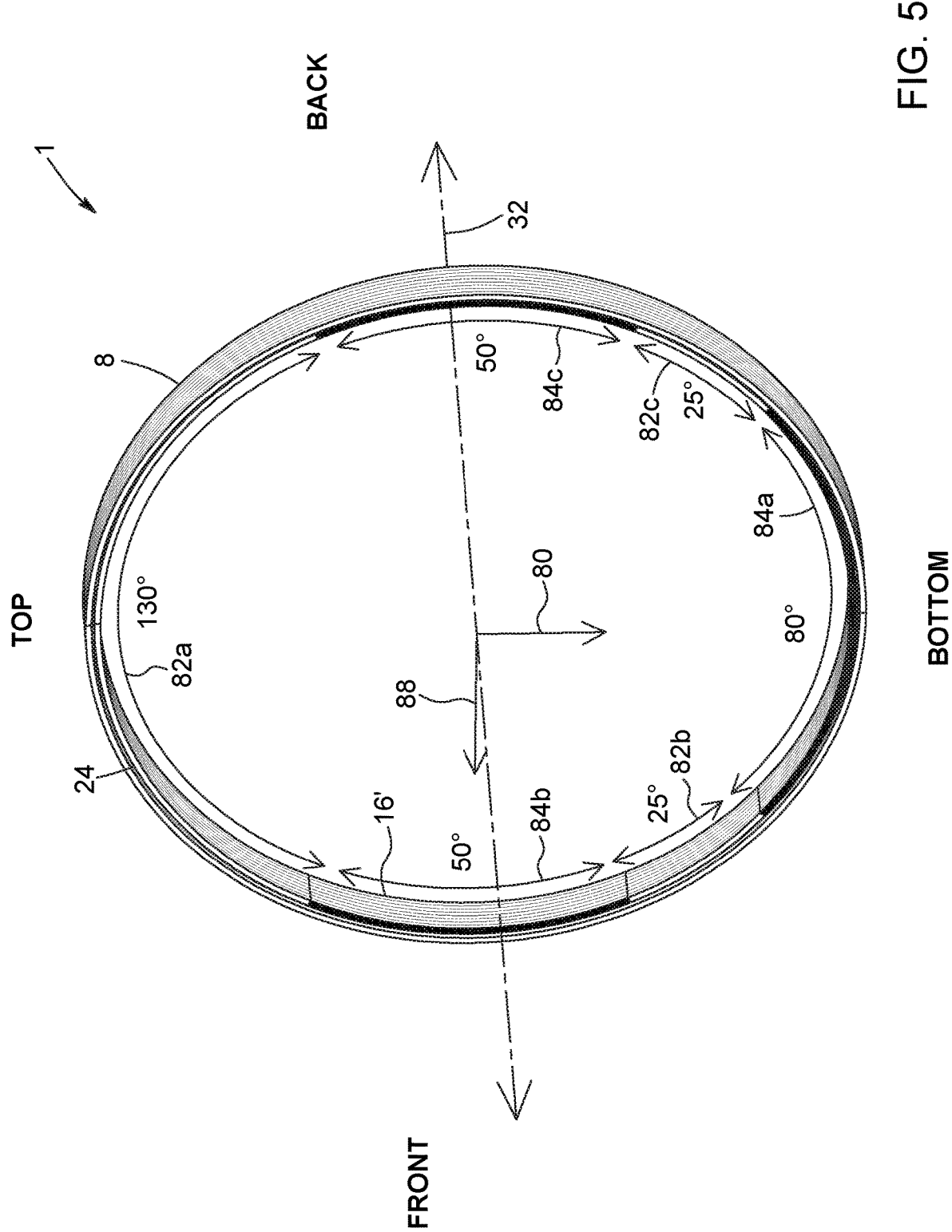
FIG. 5 illustrates a perspective view of a PMB according to an alternative example embodiment.

Similarly, FIG. 1A and the associated description provide a specific configuration of the first set of at least one angular region of the second magnetic ring element 16 having the first varying Halbach array and the second set of at least one angular region of the second magnetic ring element 16 having the second varying Halbach array and it will be understood that other angular arrangements of the Halbach arrays can be implemented (ex: FIG. 5 presents another possible configuration). More particularly, the number of angular regions having the first Halbach array within the first set and the number of angular regions having the second Halbach array within the second set can be varied. The angular position and angular width of each angular region can also be varied. In other configurations, the second magnetic ring element can have more than two varying Halbach array patterns.

Figure 4:
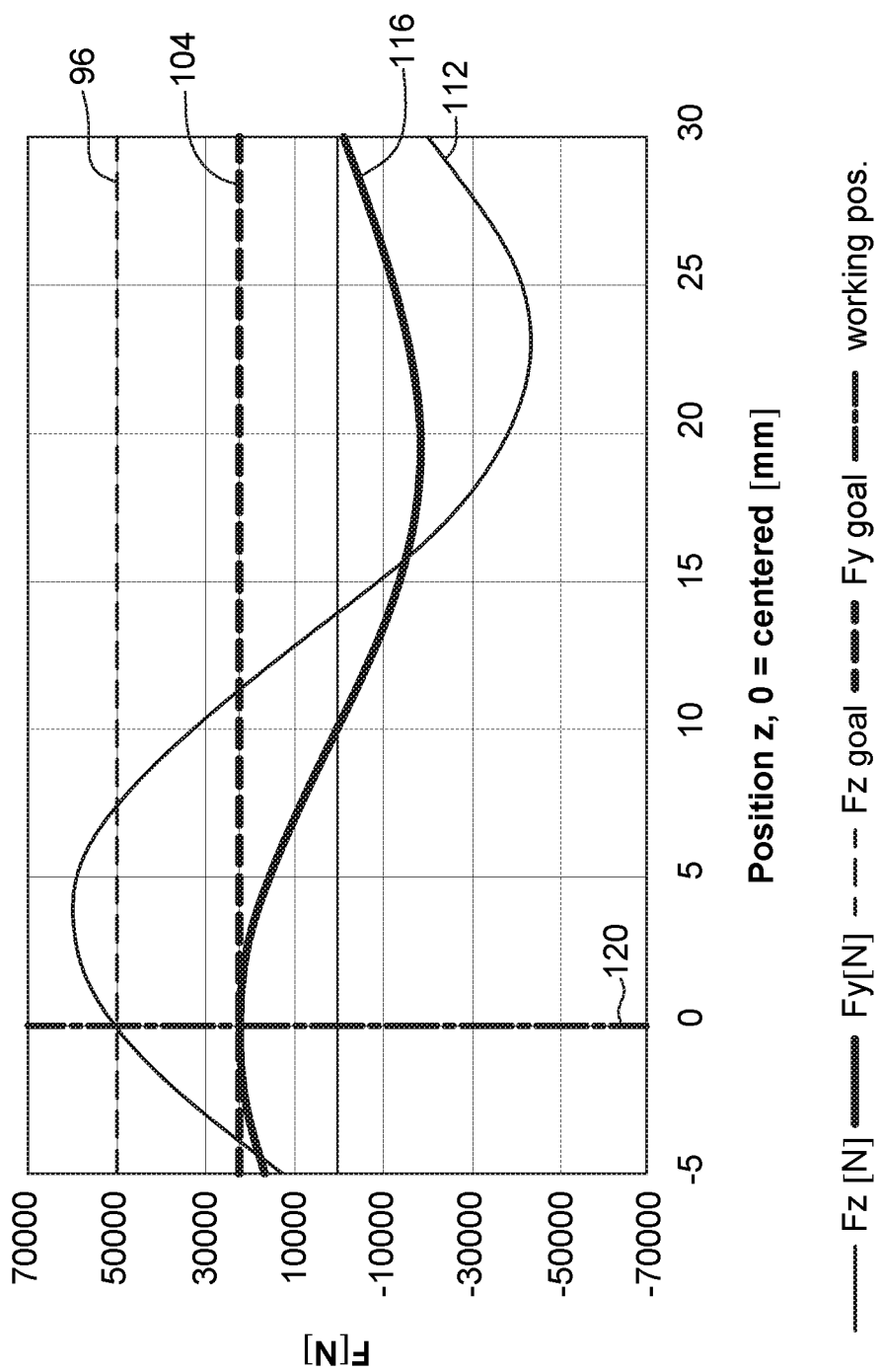
FIG. 4 illustrates a graph showing in single-mode, the axial component and the radial component at the specific angular position of the combined force applied to the first magnetic ring element as a function of the position of the first magnetic ring element along the axial direction relative to the second magnetic ring element according to an example embodiment.

Referring now to FIG. 4, therein illustrated is a graph showing the variable axial component and the radial component at the specific angular position of the variable combined force applied to the first magnetic ring element 8 as a function of the position of the first magnetic ring element 8 along the axial direction 32 relative to the second magnetic ring element 16 according to an example embodiment. The graph was generated by modelling the improved PMB 1 illustrated in FIG. 1 and having the variable Halbach arrays of FIGS. 2 and 3. In the illustrated example, a predetermined target axial force 96 is set at 50000 N (Fz goal). A target radial force 104 at the specific angular position is set at 22500 N (Fy goal). A first curve 112 shows the variable axial component of the variable combined force from the magnetic interaction of the magnetic ring elements 8 and 16 as a function of the position of the first magnetic ring element along the axial direction 32 (i.e. relative to the second magnetic ring element 16). A second curve 116 shows the variable radial component at the specific angular portion of the variable combined force from the magnetic interaction of the magnetic ring elements 8 and 16 also as a function of the position of the first magnetic ring element 8 along the axial direction 32. Notably, at a working position 120 (z=0), the axial component 112 of the combined force substantially matches the predetermined target axial force 96 and the radial component 116 of the combined force substantially matches the predetermined target radial force 104.

While the performance graph of FIG. 4 shows the target axial force 96 and the target radial force 104 being achieved at the target position 120 (z=0), FIG. 4 also illustrates a variable combined forced curve for an operating range that extends on either side of the working position 120 (z=0). It will be readily appreciated that both the first curve 112 and the second curve 116 vary significantly relative to position z. However, in proximity of position z=0 (ex: z=±2 mm), the curves 112 and 116 have favorable characteristics. Accordingly, the operating range can be defined as z=±2 mm according to the illustrated example embodiment. Within this operating range, the force curve 112 representing the variable axial component is rising. In operation, as external forces in the axial direction decrease, the first ring element 8 will shift towards the negative range and also have an axial force component according to force curve to counteract the decreasing external axial force. Similarly, as external forces in the axial direction increase, the first ring element 16 will shift towards the positive range and also have an axial force component according to the force curve to counteract the increasing external axial force.

It will be understood that appropriately selecting parameters and parameters' values of the improved PMB 1 so that the axial and radial variable force components of the combined forces of the magnetic interaction of its ring elements 8, 16 substantially matches the target axial force 96 and the target axial force 116 allows for taking advantage of loopholes in Earnshaw's Theorem. More particularly, the improved PMB 1 can be deployed in an operating environment in which it will be subjected to external forces that can be characterized as having an axial component counteracting the target axial force 96 or the target axial force curve and a radial component counteracting the target radial force 104, and further having a relatively small force in the side-to-side direction of the third axis 88. It will be further understood that when deployed in this operating environment, the first magnetic ring element 8 will be substantially stationary relative to the second magnetic ring element 16 from the axial component of the external force cancelling out the axial component 112 of the variable combined force of the magnetic interaction within the improved PMB 1 and from the radial component of the external forces cancelling out the variable radial component 116 of the combined force of the magnetic interaction within the PMB 1. Alternatively, the first magnet ring element 8 will be moving within its operating range relative to the second magnetic ring 16 in the axial direction, whereby as the axial component of the external force is varied, the first magnet ring element 8 is translated in the Z-axis to achieve a combined force according to the force curve to counteract the external forces.

Referring now to FIG. 5, therein illustrated is a perspective view of a PMB 1' according to an alternative example embodiment. The alternative improved PMB 1' has a second magnetic ring element 16' that has a first varying Halbach array that extends over a first set of angular regions thereof and a second varying Halbach array that extends over a second set of angular regions thereof. The first set of angular regions and the second set of angular regions can have an alternating arrangement while being symmetrical or asymmetrical about the top-bottom axis 80. The first varying Halbach array is different from the second varying Halbach array. The first varying Halbach array of the second magnetic ring element 16 can have the magnetic pattern as illustrated in FIG. 2 and the second varying Halbach array of the second magnetic ring element 16 can have the magnetic pattern as illustrated in FIG. 3. The first magnetic ring element 8 of the alternative PMB 1' can have a varying Halbach array that is constant about its entire circumference. This varying Halbach array of the first magnetic ring element 8 can have the magnetic pattern as illustrated in FIGS. 2 and 3. Accordingly, the first set of angular regions of the alternative PMB 1' have a repelling magnetic interaction and the second set of angular regions have an attracting magnetic interaction.

Continuing with FIG. 5, the first set of angular regions of the second magnetic ring element 16' that have the first varying Halbach array extend over a top-wise portion 82a

(ex: 130 degree arc or any angle of different degrees), and two lower-side portions 82b, 82c (ex: 25 degree arcs each or any angle of different degrees). The second set of angular regions of the second magnetic ring element 16' that have the second varying Halbach array extend over a bottom-wise portion 84a (ex: 80 degree arc or any angle of different degrees) and two side portions 84b, 84c (50 degree arcs each or any angle of different degrees).

Figure 6:
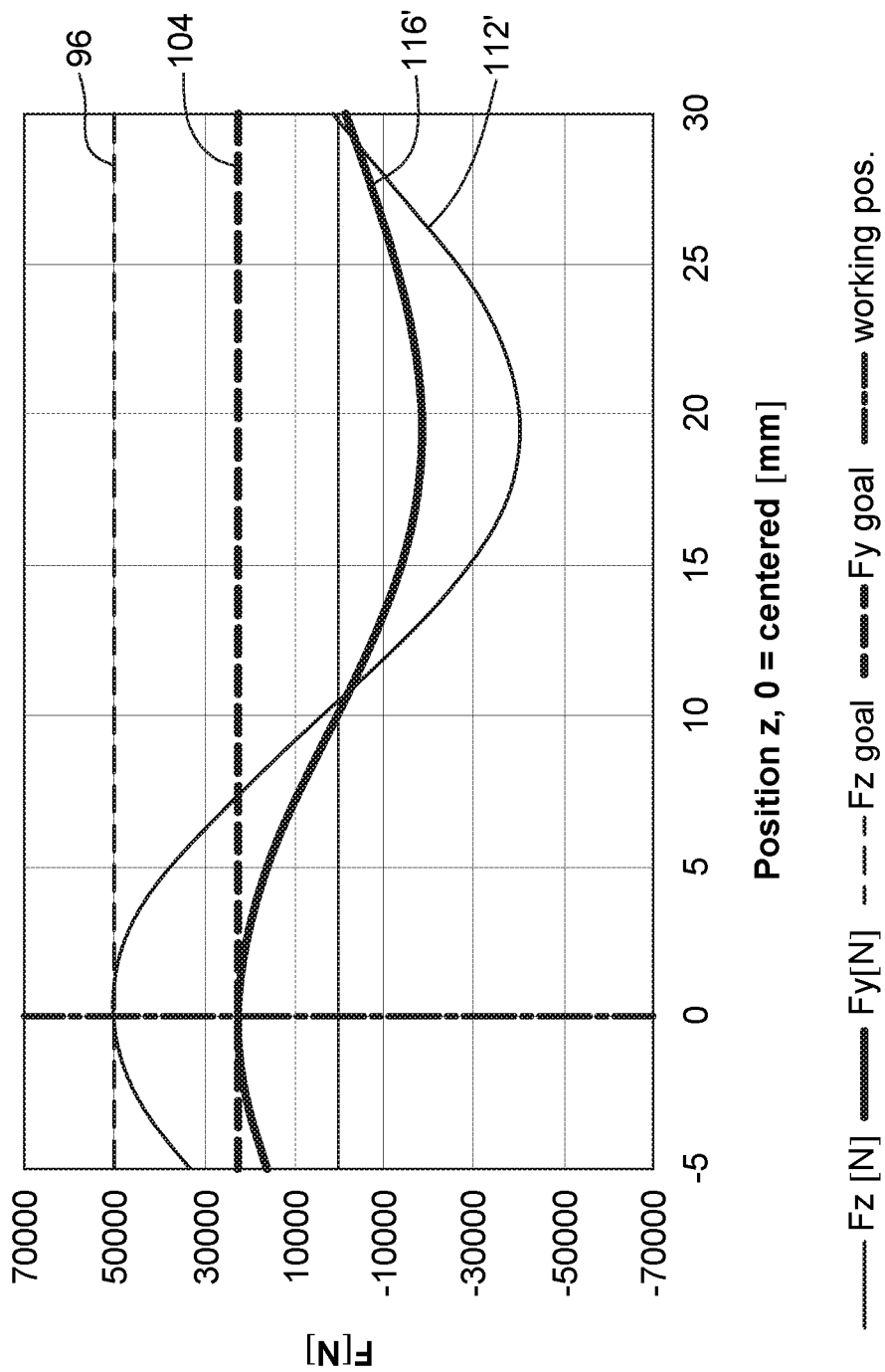
FIG. 6 illustrates a graph showing in single-mode, the axial component and the radial component at the specific angular position of the combined force applied to the first magnetic ring element as a function of the position of the first magnetic ring element along the axial direction relative to the second magnetic ring element within the alternative example embodiment.

Referring now to FIG. 6, therein illustrated is a graph showing the axial variable force component and the variable force radial component at the specific angular position of the variable combined force applied to the first magnetic ring element 8 as a function of the position of the first magnetic ring element 8 along the axial direction 32 relative to the second magnetic ring element 16' within the alternative PMB 1'. The graph was generated by modelling the PMB 1' illustrated in FIG. 5 and having the variable Halbach arrays of FIGS. 2 and 3. The same target axial force 96 (Fz goal=50000 N) and target radial force 104 at the specific angular position (Fy goal=22500 N) as for graph of FIG. 4 are defined. A first curve 112' shows the variable axial component of the variable combined force from the magnetic interaction of the magnetic ring elements 8 and 16' as a function of the position of the first magnetic ring element 8 along the axial direction 32 (i.e. relative to the second magnetic ring element 16'). A second curve 116' shows the variable radial component at the specific angular portion of the variable combined force from the magnetic interaction of the magnetic ring elements 8 and 16' also as a function of the position of the first magnetic ring element 8 along the axial direction 32. Notably, at a working position 120 (z=0), the variable axial component 112' of the variable combined force within the alternative improved PMB 1' substantially matches the predetermined target axial force 96 and the variable radial component 116' of the variable combined force substantially matches the predetermined target radial force 104. Accordingly, the characteristics of the alternative improved PMB 1' allows it to take advantage of loopholes in Earnshaw's Theorem in a similar way as for the exemplary improved PMB 1 illustrated in FIG. 1. This also allows the alternative PMB 1' to be deployed in the same operating environment as described hereinabove, wherein in this deployment, the first magnetic ring element 8 will also be substantially stationary relative to the second magnetic ring element 16' while also being freely rotatable about the second magnetic ring element 16' and maintaining an operational radial gap 24 therebetween.

In order to validate, and further optimize, that one or more PMB(s) can be deployed while allowing the rotor to be substantially stationary within the operating environment, thereby providing three (3) states coordinates levitation between the rotor and stator and substantially frictionless rotation of the rotor, many runs were conducted on a supercomputer (CRAY Computer with a large number cells each run). The computational modeling runs considered a combination of the 1) the magnetic interaction provided from different designs of the PMB (different varying Halbach arrays and different angular regions on the ring elements), 2) computational fluid dynamics of the stator/rotor and the operating environment, 3) the hydrostatic effects from surface treatment. FIGS. 4 and 6 illustrate the output of such simulations.

Furthermore, a calibrated magnetic bearing test ("MBTB-1") was prepared to validate such simulations. The test bench includes a physical 25 degree segment of the first ring element 8 and physical 25 degree segments of the second ring element 16 (one segment corresponding to the first Halbach array as found in first angular region 40 and another segment corresponding to the second Halbach array as found in the second angular region 64). Three (3) load cells with three (3) force components each, five (5) LASER instruments, one linear Magento-strictive device, one Multi-Axis Numeric Axis Motion Control System, one servo motor with one resolver and high accuracy translation table were used to measure the variable forces.

In a first test using the MBTB-1, the physical segment of the first ring element 8 is displaced in the Z-axis direction relative to first segment of the second ring element 16 (the segment corresponding to the first Halbach array as found in the first angular region 40/cross section A-A). Measurements of the forces caused by the magnetic field interaction of the two segments are measured as the segment is displaced. The segments are displaced from an initially non-overlapping position to a fully overlapping position and beyond.

Figure 7B:
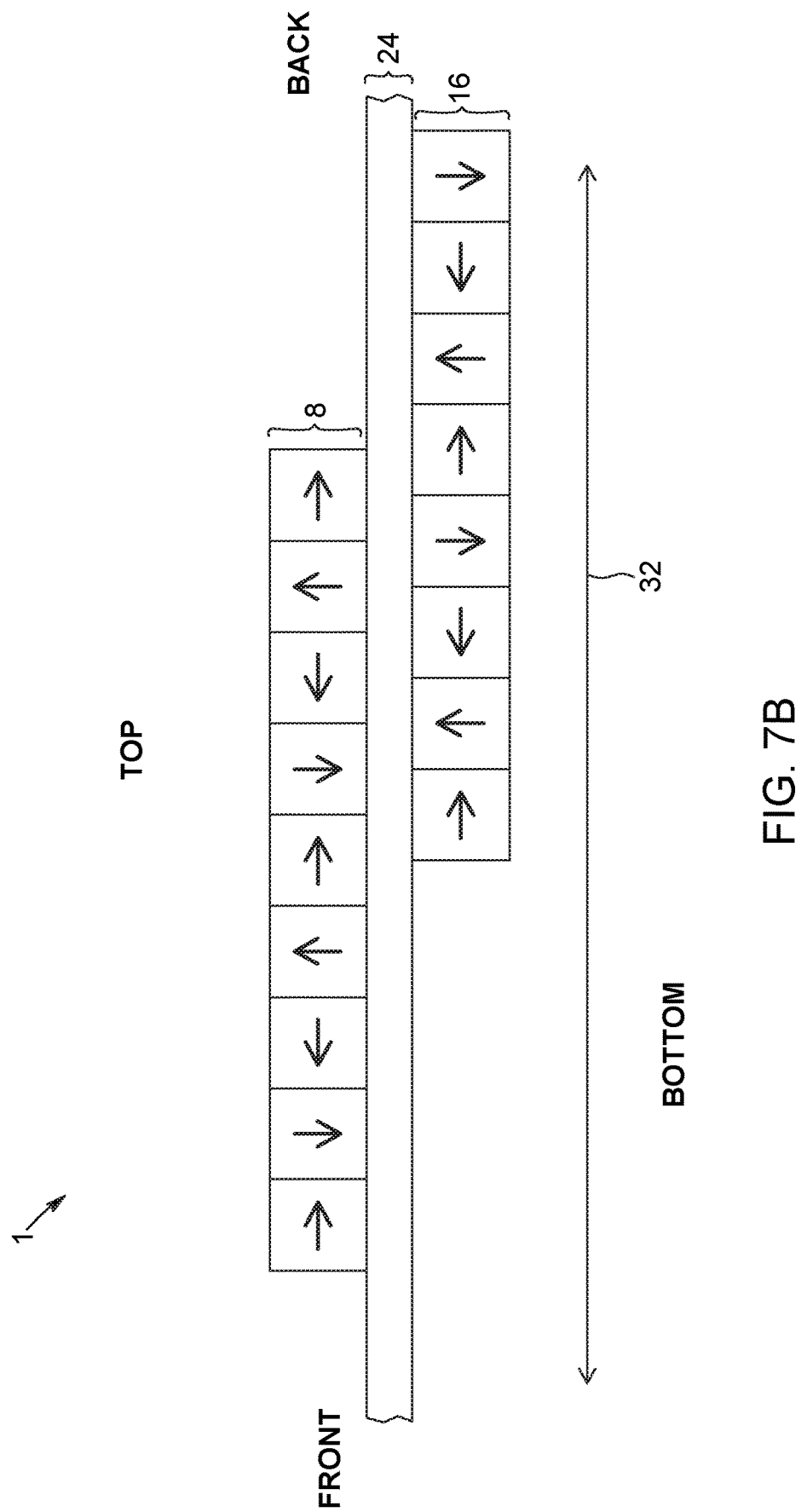
FIG. 7B illustrates a cross-sectional view showing a partial overlap of the first ring element and a first Halbach array of the second ring element according to one example embodiment.

FIG. 7A shows a graph of the measured forces on the segment of the first ring element in the Y-axis direction and Z-axis direction as it is displaced in the axial Z-direction relative to the first segment of the second ring element. The measured graph shows multiple peaks and valleys during displacement of the segment. The cycle 132 having a shallower peak/valley indicates the presence of a first stable operating mode. It will be appreciated that this mode can be useful to counteract a first range of weaker external forces. This cycle having the shallower peak/valley is caused by partial overlapping of the segments in the axial Z-direction where a portion of the Halbach arrays of the first and second ring elements 8 and 16 are in magnetic interaction. This partial overlapping is represented in the cross-sectional view of FIG. 7B. A further cycle having a stronger peak and valley indicates the presence of a further stable operating mode.

In a second test using the MBTB-1, the physical segment of the first ring element 8 is displaced in the Z-axis direction relative to second segment of the second ring element 16 (the segment corresponding to the second Halbach array as found in the first angular region 64/cross-section B-B). Measurements of the forces caused by the magnetic field interaction of the two segments are measured as the segment is displaced. The segments are displaced from an initially non-overlapping position to a fully overlapping position and beyond.

FIG. 8A shows a graph of the measured forces on the segment of the first ring element in the Y-axis direction and Z-axis direction as it is displaced in the axial Z-direction relative to the physical second segment of the second ring element. The measured graph shows multiple peaks and valleys during displacement of the segment. The cycle 140 having a shallower peak/valley indicates the presence of a first stable operating mode. It will be appreciated that this mode can be useful to counteract a first range of weaker external forces. This cycle having the shallower peak/valley is caused by partial overlapping of the segments in the axial Z-direction where a portion of the Halbach arrays of the first and second ring elements 8 and 16 are magnetically interaction. This partial overlapping is represented in the cross-sectional view of FIG. 8B. A further cycle having a stronger peak and valley indicates the presence of a further stable operating mode.

It will be appreciated that cycles 132 and 140 are offset along the axial Z-direction such that the combined force from summing the magnetic interactions over the entire circumference of the PMB produces a smooth force curve as shown in FIGS. 4 and 6.

Figure 9:
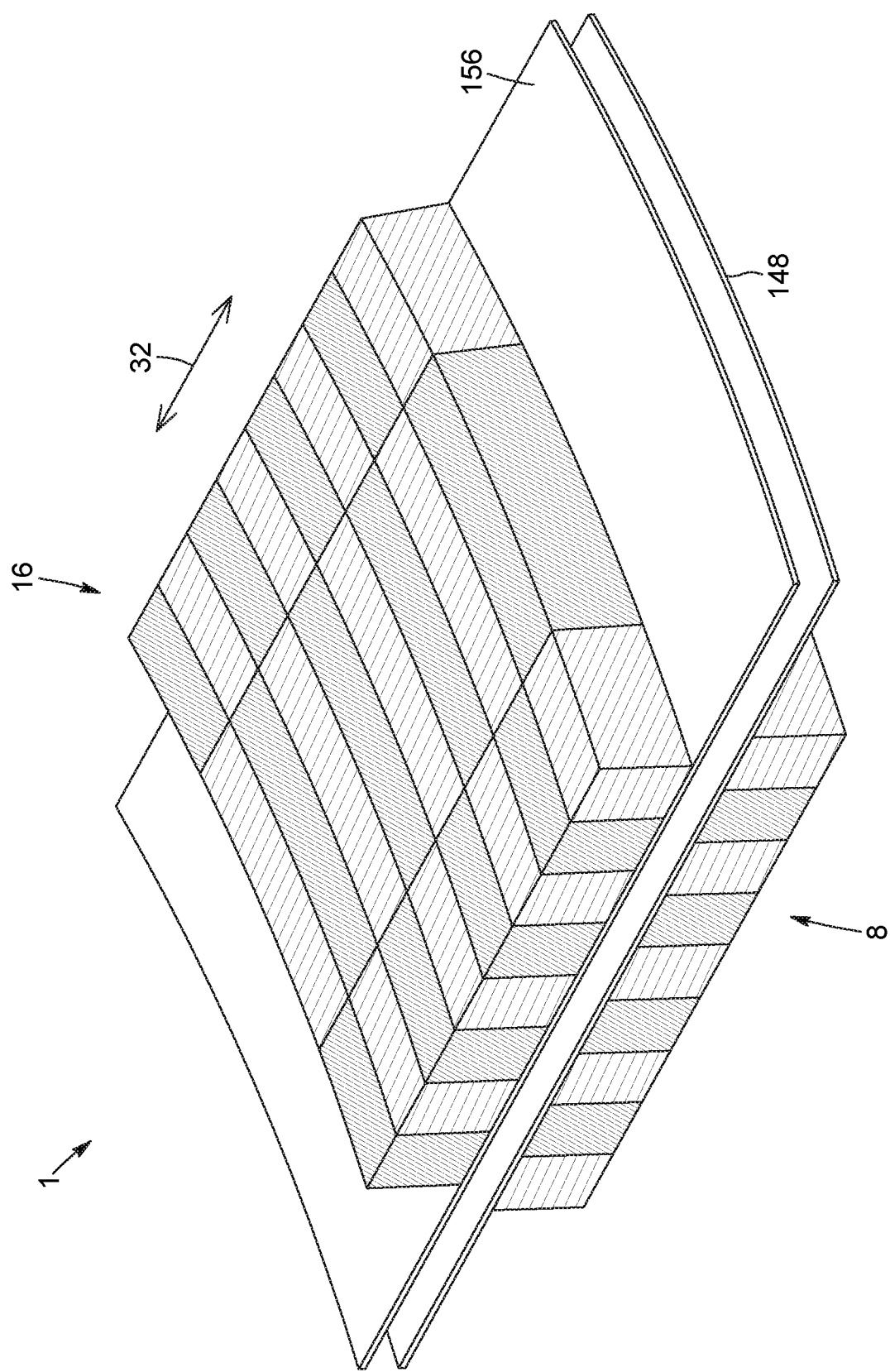
FIG. 9 illustrates a perspective view of a segment of the improved passive magnetic bearing according to an example embodiment.
Figure 10:
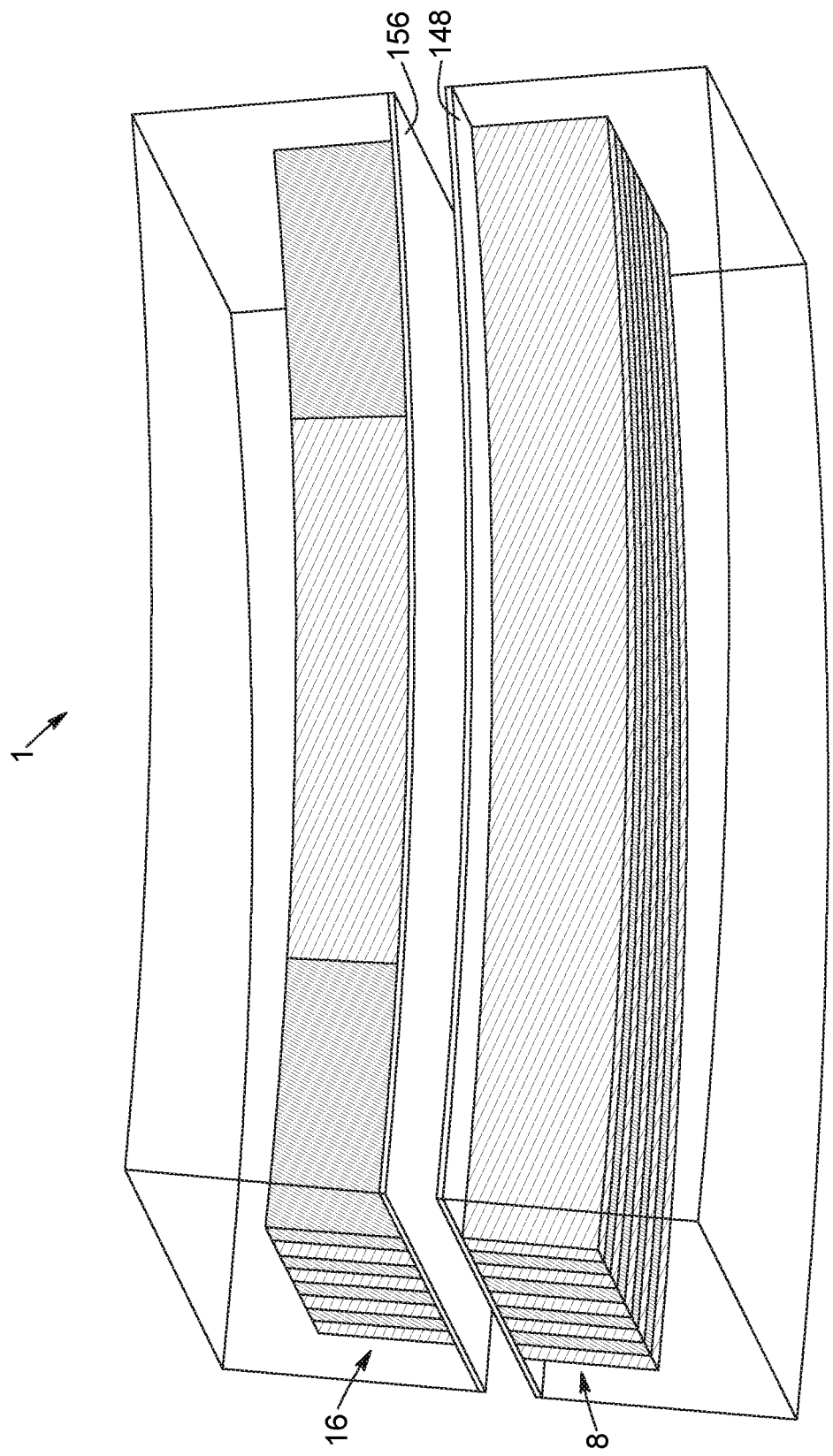
FIG. 10 illustrates a perspective view of the segment of the improved passive magnetic bearing according to the example embodiment showing the housing in the transparency.

Referring now to FIGS. 9 and 10, therein illustrated are perspective three-dimensional views of a segment of the improved PMB 1 according to an example embodiment. The permanent magnets forming the Halbach arrays of the first and second ring elements 8 and 16 are illustrated. The permanent magnets of each ring element is each supported by a respective isolating media 148, 156. The isolating media can be a stainless steel media. The media isolates the permanent magnets from external fluids when placed in an operating environment. The media covers at least a circumferential surface of each of the ring elements. In the illustrated example, an inner circumferential surface of the first ring element 8 is covered and an outer circumferential surface of the second ring element 16 is covered.

As illustrated in FIG. 10, the isolating media can further include a housing (shown in transparency) that further houses each of the first and second ring elements. The housing can envelope each of the exposed surfaces of the permanent magnets forming the first and second ring elements.

According to one exemplary application of the improved PMB described herein according to various exemplary embodiments, at least one improved PMB can be integrated within any rotating machinery having a rotating element and, for example to a turbine having a fluid as generating energy such as water, steam, gas or wind. The turbine has a stator and a rotor that is rotatable about the stator. The first ring element 8 of the at least one PMB is integrated within the rotor and second ring element 16 of the at least one PMB is integrated within the stator. It will be understood that the first ring element(s) 8 and the second ring element(s) 16 of the PMB(s) integrated within the water or wind turbine provide the magnetic levitation interface between the rotor and the stator along axis 32, 80 and 88. More particularly, the interaction between the first and second ring elements of the PMB(s) provide the frictionless rotational relationship between the rotor and the stator.

The water, wind, or gas turbine is configured to be deployed within an operating environment, such as a body of water or wind having a water, wind or gas flow. The body of water or wind can be a river or air the interior of a water or wind pipe or any open channel, which may be natural or manmade. It will be understood that the operating environment will exert various external forces onto the water, wind or gas turbine and the PMB(s) 1 integrated therein. The water, wind or gas turbine is appropriately designed in accordance with the operating environment so that the axial component of the sum of the variable combined force(s) from magnetic interaction of the magnetic ring elements 8, 16 of the improved PMB(s) 1 substantially matches the external forces in the axial direction within the operating environment. Where a single improved PMB is integrated, the axial component of the combined force or combined force curves from the magnetic interaction within the improved PMB 1 should match the external forces in the axial direction 32. Where a plurality of PMBs are integrated, axial components of the combined forces from all of the PMBs 1 together (i.e. the sum of the combined force or combined force curves) should match the external forces in the axial direction 32.

When deployed in the operating environment having a water, wind or gas flow, the rotor (having the first magnetic ring element) is oriented to be axially aligned with the torque generating direction of the water wind, or gas flow. The external forces in the axial direction 32 includes (ex: consists essentially of) the flow force in the torque generating direction. The force of the fluid flow acting on the blades of the rotor generates torque in the rotor. This fluid flow applies a force in the axial direction on the first ring elements 8 that counteracts the axial force component of the sum of the combined force of the improved PMB(s) 1.

Where the force of the fluid flow is variable, it is variably counteracted by the axial force component of the sum of the combined force of the improved PMB(s) 1 according to their combined force curve. For example, within a specific operating environment, such a specific body of water (ex: a river), having known flow characteristics, the PMB(s) 1 are configured and/or selected to provide a specific combined force curve in the axial direction to counteract the known flow characteristics. For example, a flow force lower limit and an flow force upper limit can be defined for the fluid flow in the torque generating direction, and the improved PMB(s) 1 of the given turbine is specifically designed to have a combined force curve in the axial direction capable of accommodating the flow force at the lower limit, at the upper limit and any flow force therebetween while the first and second ring elements of the improved PMB(s) are within their operating range of relative positions in the axial direction.

The water, steam, air, wind or gas turbine is also appropriately designed in accordance with the operating environment so that the radial component at the specific angular position from magnetic interaction of the magnetic ring elements 8, 16 of the improved PMB(s) 1 substantially matches the external forces in the radial direction within the operating environment. Where a single improved PMB 1 is integrated, the variable radial component of the variable combined force from the magnetic interaction within the PMB 1 should match the external forces in the radial direction. Where a plurality of the improved PMB 1 are integrated, radial components of the variable combined forces from all of the improved PMB 1 together (i.e. the sum of the variable combined forces) should match the external forces in the radial direction.

When deployed in the operating environment in the real world, the rotor has a defined weight within the operating environment due to the force of gravity. This weight acts as a force in the radial direction at the specific angular position, corresponding to the top-bottom axis 80, that counteracts the radial component of the sum of the combined force of the improved PMB(s) 1.

Figure 11:
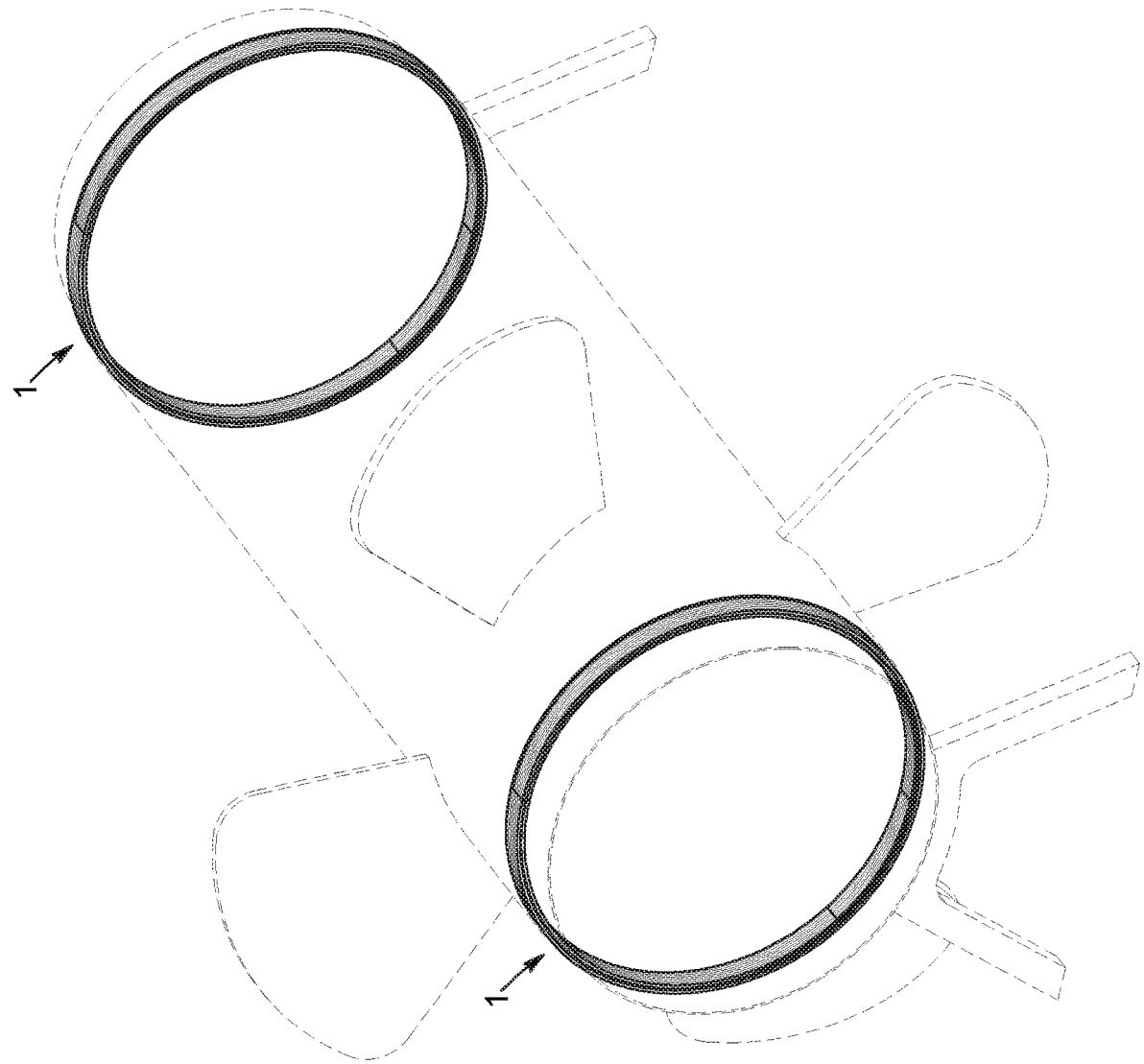
FIG. 11 illustrates a rotating machinery integrating a set of the improved passive magnetic bearing according to the example embodiment.

FIG. 11 illustrates a perspective view of an exemplary turbine integrating two improved PMBs along its rotor/stator length.

Other external forces, include the dynamic effect of the fluid (ex: water or any fluid) film developed within the rotation of the rotor, create hydrostatic forces that work in conjunction with the improved PMB(s) 1. The hydrostatic forces are particularly prevalent on the interface surfaces of the rotor and stator; The hydrostatic forces will further depend on the surface treatment of the interface surfaces. According to one example, these surfaces can be enhanced with particles deposited with High Velocity Oxygen Fuel (HVOF) and high performance semi-crystallin thermoplastic poly-ether-ether-ketone or similar material function integrated to the rotating machineries surfaces interfaces.

Additional forces from the electrical generator electromagnetic interaction are also taken into account in the improved PMB(s) design to provide the stability within the targeted operational ranges.

In summary, the environmental factors that can exert external forces onto the rotor, and therefore the freely rotatable first ring element(s) 8, include:

gravitational forces on the first magnetic ring element 8—external variable force in the radial direction at the specific angular position (top-bottom axis 80);

water, steam, air, wind, gas flowing against the blades of the rotor or other means of generating a mechanical torque to cause rotation thereof—external force in the axial direction 32;

hydrostatic forces acting on the interface surfaces between the rotating element and non-rotating element such as the rotor and stator;

electrical generator electromagnetic forces;

These external forces must be canceled out by the axial, radial and side-to-side forces components of the combined force or combined force curved caused by the magnetic interaction of the magnetic ring elements 8, 16 of the improved PMB(s) 1 integrated in the water, wind, gas, or other torque generating turbine in order to maintain the first magnetic ring element(s) 8 in a stationary position or within a predefined operating range relative to the second ring element(s) 16, and thereby permit three (3) states coordinates levitation to ensure stable operation at the different design regime operating of the rotor. That is, the rotor will be in a sort of levitation it its operating environment. Accordingly, the target axial force or force curve, the target radial force or force curve and the target side-to-side force or force curve of the improved PMB(s) are predetermined according to the external forces expected within the operating environment.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A passive magnetic bearing comprising:
   a first ring element having an axial depth and being formed of magnetic material, the first ring element further having a Halbach array, the Halbach array being constant about a circumference of the first ring element;
   a second ring element having an axial depth and being formed of magnetic material, the second ring element being substantially concentric with the first ring element and being positioned relative to the first ring element within an operating range defined in an axial direction, the second ring element having:
   a first Halbach array extending angularly over a first set of at least one angular region of the second ring element; and
   a second Halbach array extending angularly over a second set of at least one angular region of the second ring element;
   wherein the first ring element is rotatable about the second ring element; and
   wherein the magnetic interaction from the Halbach array of the first ring element with the first and second Halbach arrays of the second ring element, when positioned relative to each other within the operating range defined in the axial direction, defines a combined force curve having:
   an axial component in the axial direction substantially matching a predetermined target axial force curve; and
   a radial component in the radial direction at a predetermined angular position substantially matching a predetermined target radial force curve.

2. The passive magnetic bearing of claim 1, wherein the axial component of the combined force curve varies according to relative positions of the first ring element and the second ring element along the axial direction within the operating range.

3. The passive magnetic bearing of claim 1, wherein the radial component of the combined force curve is substantially constant for relative positions of the first ring element and the second ring element along the axial direction within the operating range.

4. The passive magnetic bearing of claim 1, wherein the magnetic field characteristics of the Halbach array of the first ring element is variable in the axial direction.

5. The passive magnetic bearing of claim 4, wherein the Halbach array of the first ring element is formed of a plurality of discrete magnets positioned in the axial direction, the discrete magnets having different magnet characteristics; and
   wherein the different magnet characteristics of the plurality of discrete magnets forming the Halbach array of the first ring element comprises one or more of magnetic material, magnetic field orientation, magnetic field strength, magnet height, magnet width and magnet depth.

6. The passive magnetic bearing of claim 1, wherein the magnetic field characteristics of the first Halbach array of the second ring element is variable in the axial direction; and
   wherein the magnetic field characteristics of the second Halbach array of the second ring element is variable in the axial direction.

7. The passive magnetic bearing of claim 6, wherein the first Halbach array of the second ring element is formed of a plurality of discrete magnets positioned in the axial direction, the discrete magnets having different magnet characteristics;
   wherein the second Halbach array of the second ring element is formed of a plurality of discrete magnets positioned in the axial direction, the discrete magnets having different magnet characteristics;
   wherein the different magnet characteristics of the first Halbach array of the second ring element comprises one or more of magnetic material, magnetic field orientation, magnetic field strength, magnet height, magnet width and magnet depth; and
   wherein the different magnet characteristics of the second Halbach array of the second ring element comprises one or more of magnetic material, magnetic field orientation, magnetic field strength, magnet height, magnet width and magnet depth.

8. The passive magnetic bearing of claim 1, wherein the first ring element and the second ring element have a first substantially stable magnetic interaction corresponding to a first relative position of the first ring element and second ring element in the axial direction; and
   wherein the first ring element and the second ring element have a second substantially stable magnetic interaction corresponding to a second relative position of the first ring element and the second ring element in the axial direction.

9. The passive magnetic bearing of claim 1, wherein the first ring element is rotatable about the second ring element while maintaining an operating radial gap therebetween.

10. The passive magnetic bearing of claim 1, wherein the first ring element is rotatable while being free of a mechanical contact with the second ring element.

11. The passive magnetic bearing of claim 1, wherein the first ring element is an outer ring and the second ring element is an inner ring.

12. The passive magnetic bearing of claim 1, wherein the magnetic interaction between the Halbach array of the first ring element and the first Halbach array of the second ring element produces a repelling force on the first ring element; and wherein the magnetic interaction between the Halbach array of the first ring element and the second Halbach array of the second ring element produces an attracting force on the first ring element.

13. A passive magnetic bearing comprising:
a first ring element having an axial depth and being formed of magnetic material, the first ring element further having a Halbach array, the Halbach array arrangement being constant about a circumference of the first ring element;
a second ring element having an axial depth and being formed of magnetic material, the second ring element being substantially concentric with the first ring element and being substantially aligned in an axial direction with the first ring element, the second ring element having:
a first Halbach array extending angularly over a first set of at least one angular region of the second ring element; and
a second Halbach array extending angularly over a second set of at least one angular region of the second ring element;
wherein the first ring element is rotatable about the second ring element; and
wherein the magnetic interaction from the varying Halbach array of the first ring element with the first and second varying Halbach arrays of the second ring element when the first ring element and the second ring element are substantially aligned defines a combined force having:
an axial component in the axial direction substantially matching a predetermined target axial force; and
a radial component in the radial direction at a predetermined angular position substantially matching a predetermined target radial force.

14. The passive magnetic bearing of claim 13, wherein the first ring element is rotatable about the second ring element while maintaining a radial operating gap therebetween.

15. The passive magnetic bearing of claim 13, wherein the first ring element is rotatable while being free of a mechanical contact with the second ring element.

16. The passive magnetic bearing of claim 13, wherein the first ring element is an outer ring and the second ring element is an inner ring.

17. The passive magnetic bearing of claim 13, wherein the magnetic field characteristics of the Halbach array of the first ring element is variable in the axial direction.

18. The passive magnetic bearing of claim 17, wherein the Halbach array of the first ring element is formed of a plurality of discrete magnets positioned in the axial direction, the discrete magnets having different magnet characteristics; and wherein the different magnet characteristics of the plurality of discrete magnets forming the Halbach array of the first ring element comprises one or more of magnetic material, magnetic field orientation, magnetic field strength, magnet height, magnet width and magnet depth.

19. The passive magnetic bearing of claim 13, wherein the magnetic field characteristics of the first Halbach array of the second ring element is variable in the axial direction; and wherein the magnetic field characteristics of the second Halbach array of the second ring element is variable in the axial direction.

20. The passive magnetic bearing of claim 19, wherein the first Halbach array of the second ring element is formed of a plurality of discrete magnets positioned in the axial direction, the discrete magnets having different magnet characteristics;

wherein the second Halbach array of the second ring element is formed of a plurality of discrete magnets positioned in the axial direction, the discrete magnets having different magnet characteristics;

wherein the different magnet characteristics of the first Halbach array of the second ring element comprises one or more of magnetic material, magnetic field orientation, magnetic field strength, magnet height, magnet width and magnet depth; and wherein the different magnet characteristics of the second Halbach array of the second ring element comprises one or more of magnetic field orientation, magnetic field strength, magnet height, magnet width and magnet depth.

21. A turbine for deployment within an operating environment having a fluid flow for generating torque, the turbine comprising:
a stator;
a rotor rotatable about the stator; and
a set of at least one passive magnetic bearing according to claim 1, the first ring element of the passive magnetic bearing of the set being integrated within the rotor and the second ring element of the passive magnetic bearing of the set being integrated within the stator.

22. The turbine of claim 21, wherein the axial component of the sum of the combined force curve of the set of at least one passive magnetic bearing substantially matches the external forces in the axial direction within the operating environment;

wherein fluid flow has a defined flow force in a torque generating direction;

wherein the rotor is axially aligned with the torque generating direction; and wherein the external forces in the axial direction within the operating environment include the flow force in the torque generating direction.

23. The turbine of claim 22, wherein the defined flow force in the torque generating direction is defined between a flow force lower limit and a flow force upper limit; and wherein during operation of the turbine, the relative position of the first ring element and the second ring element within the operating range defined in the axial direction varies in accordance with variance of the flow force in the torque generating direction between its flow force lower limit and an flow force upper limit.

24. The turbine of claim 21, wherein the radial component of the sum of the combined force of the set of at least one passive magnetic bearing substantially matches the external forces in the radial direction at the predetermined angular position within the operating environment; and wherein the rotor has a defined weight within the operating environment and wherein the external forces in the radial direction within the operating environment includes a gravitational weight of the rotor when placed within the operating environment.

25. The turbine of claim 21, wherein the turbine is one of a water turbine, wind turbine or gas turbine.

26. A turbine for deployment within an operating environment having a fluid flow for generating torque, the turbine comprising:
- a stator;
- a rotor rotatable about the stator; and
- a set of at least one passive magnetic bearing according to claim 13, the first ring element of the passive magnetic bearing of the set being integrated within the rotor and the second ring element of the passive magnetic bearing of the set being integrated within the stator.

27. The turbine of claim 26, wherein the axial component of the sum of the combined force of the set of at least one passive magnetic bearing substantially matches the external forces in the axial direction within the operating environment; and
- wherein fluid flow has a defined flow force in a torque generating direction;
- wherein the rotor is axially aligned with the torque generating direction; and
- wherein the external forces in the axial direction within the operating environment include the flow force in the torque generating direction.

28. The turbine of claim 27, wherein the defined flow force in the torque generating direction is defined between a flow force lower limit and a flow force upper limit; and
- wherein during operation of the turbine, the substantial alignment in the axial direction of the first ring element and the second ring element is maintained while the flow force in the torque generating direction varies between its flow force lower limit and a flow force upper limit.

29. The turbine of claim 27, wherein the radial component of the sum of the combined force of the set of at least one passive magnetic bearing substantially matches the external forces in the radial direction at the predetermined angular position within the operating environment; and
- wherein the rotor has a defined weight within the operating environment and wherein the external forces in the radial direction within the operating environment includes a gravitational weight of the rotor when placed within the operating environment.

30. The turbine of claim 26, wherein the turbine is one of a water turbine, wind turbine or gas turbine.

* * * * *

UNITED STATES PATENT AND TRADEMARK OFFICE
CERTIFICATE OF CORRECTION

PATENT NO.         : 11,105,367 B2                                         Page 1 of 1
APPLICATION NO.    : 16/745916
DATED              : August 31, 2021
INVENTOR(S)        : Imad Hamad It is certified that error appears in the above-identified patent and that said Letters Patent is hereby corrected as shown below:

In the Claims

Column 24, Line 59, Claim 23: Delete "an flow" and insert -- a flow --

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*